United States Patent
Sheng et al.

(10) Patent No.: US 9,860,860 B2
(45) Date of Patent: Jan. 2, 2018

(54) SYNCHRONIZATION SIGNALS FOR DEVICE-TO-DEVICE COMMUNCATIONS

(71) Applicant: Sharp Laboratories of America, Inc., Camas, WA (US)

(72) Inventors: Jia Sheng, Vancouver, WA (US); Shohei Yamada, Camas, WA (US); John Michael Kowalski, Camas, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/818,855

(22) Filed: Aug. 5, 2015

(65) Prior Publication Data

US 2016/0044618 A1 Feb. 11, 2016

Related U.S. Application Data

(60) Provisional application No. 62/034,125, filed on Aug. 6, 2014.

(51) Int. Cl.
*H04W 56/00* (2009.01)
*H04W 76/02* (2009.01)

(52) U.S. Cl.
CPC ...... *H04W 56/0005* (2013.01); *H04W 76/023* (2013.01)

(58) Field of Classification Search
CPC .............................................. H04W 56/0005
USPC .................................................. 370/328, 329
See application file for complete search history.

(56) References Cited

U.S. PATENT DOCUMENTS

| 9,332,512 | B2 | 5/2016 | Sebire |
| 9,445,316 | B2 | 9/2016 | Lu |
| 2003/0061390 | A1 | 3/2003 | Schaller et al. |
| 2007/0115884 | A1 | 5/2007 | Shang |
| 2011/0092204 | A1 | 4/2011 | Iwamura et al. |
| 2011/0182280 | A1 | 7/2011 | Charbit et al. |
| 2011/0255509 | A1 | 10/2011 | Huang |
| 2012/0122463 | A1 | 5/2012 | Chen |
| 2012/0129540 | A1 | 5/2012 | Hakola |
| 2013/0051277 | A1 | 2/2013 | Hakola et al. |
| 2013/0070615 | A1 | 3/2013 | Lennartson et al. |
| 2013/0102314 | A1 | 4/2013 | Koskela |

(Continued)

FOREIGN PATENT DOCUMENTS

WO WO 2013/109100 A1 7/2013
WO 2013/171115 A1 11/2013

(Continued)

OTHER PUBLICATIONS

RP-122009, 3GPP TSG RAN Meeting #58, "Study on LTE Device to Device Proximity Services", Qualcomm Incorporated.

(Continued)

*Primary Examiner* — Ronald B Abelson
(74) *Attorney, Agent, or Firm* — Nixon & Vanderhye P.C.

(57) ABSTRACT

A user equipment (UE) may comprise a detector which is configured to detect a first sidelink synchronization signal. The UE may comprise a receiver which is configured to receive a physical sidelink channel. The physical sidelink channel may carry information specifying whether or not a source of the first sidelink synchronization signal is in-coverage. The first sidelink synchronization signal may be generated by using at least a first identity.

12 Claims, 17 Drawing Sheets

(56) References Cited

U.S. PATENT DOCUMENTS

| | | |
|---|---|---|
| 2013/0109301 A1 | 5/2013 | Hakola et al. |
| 2013/0148637 A1 | 6/2013 | Yang et al. |
| 2013/0155962 A1 | 6/2013 | Hakola et al. |
| 2013/0188546 A1 | 7/2013 | Turtinen et al. |
| 2013/0195026 A1 | 8/2013 | Johnsson et al. |
| 2013/0208697 A1 | 8/2013 | Hwang et al. |
| 2013/0223356 A1 | 8/2013 | Khoshnevis |
| 2013/0230015 A1 | 9/2013 | Hoymann et al. |
| 2013/0288668 A1 | 10/2013 | Pragada et al. |
| 2013/0308490 A1 | 11/2013 | Lim |
| 2013/0322276 A1 | 12/2013 | Pelletier et al. |
| 2013/0322413 A1 | 12/2013 | Pelletier et al. |
| 2013/0324114 A1 | 12/2013 | Raghothaman et al. |
| 2013/0331054 A1 | 12/2013 | Kodali |
| 2014/0004867 A1 | 1/2014 | Noh |
| 2014/0010172 A1 | 1/2014 | Wei et al. |
| 2014/0056220 A1 | 2/2014 | Poitau et al. |
| 2014/0086176 A1 | 3/2014 | Liu |
| 2014/0098761 A1 | 4/2014 | Lee |
| 2014/0106757 A1 | 4/2014 | Hakola |
| 2014/0128078 A1 | 5/2014 | Zhu et al. |
| 2014/0148177 A1 | 5/2014 | Ratasuk |
| 2014/0153417 A1 | 6/2014 | Gupta et al. |
| 2014/0169346 A1 | 6/2014 | Futaki |
| 2014/0185530 A1 | 7/2014 | Kuchibhotla |
| 2014/0187283 A1 | 7/2014 | Nimbalker |
| 2014/0213221 A1 | 7/2014 | Chai |
| 2014/0233528 A1 | 8/2014 | Webb |
| 2014/0269419 A1 | 9/2014 | Han |
| 2014/0274066 A1 | 9/2014 | Fodor |
| 2014/0314057 A1 | 10/2014 | Van Phan et al. |
| 2014/0342747 A1 | 11/2014 | Lee et al. |
| 2015/0043448 A1 | 2/2015 | Chatterjee |
| 2015/0071207 A1 | 3/2015 | Seo |
| 2015/0078279 A1 | 3/2015 | Ko |
| 2015/0139006 A1 | 5/2015 | Seo |
| 2015/0146687 A1 | 5/2015 | Kim |
| 2015/0208453 A1 | 7/2015 | Yamazaki |
| 2015/0215767 A1 | 7/2015 | Siomina |
| 2015/0215881 A1 | 7/2015 | Parkvall |
| 2015/0215903 A1 | 7/2015 | Zhao et al. |
| 2015/0215977 A1 | 7/2015 | Yamazaki |
| 2015/0215981 A1 | 7/2015 | Patil |
| 2015/0223184 A1 | 8/2015 | Bergstrom |
| 2015/0245193 A1 | 8/2015 | Xiong |
| 2015/0245307 A1 | 8/2015 | Chen |
| 2015/0257153 A1 | 9/2015 | Yamazaki |
| 2015/0264588 A1* | 9/2015 | Li .................... H04W 56/0015 370/350 |
| 2015/0264733 A1 | 9/2015 | Guo |
| 2015/0271720 A1 | 9/2015 | Yamada et al. |
| 2015/0271807 A1 | 9/2015 | Patil |
| 2015/0271841 A1 | 9/2015 | Yamada et al. |
| 2015/0271846 A1 | 9/2015 | Kowalski et al. |
| 2015/0304919 A1 | 10/2015 | Jung |
| 2015/0312821 A1 | 10/2015 | Yamazaki |
| 2015/0312923 A1 | 10/2015 | Guo |
| 2015/0319797 A1 | 11/2015 | Yamada et al. |
| 2015/0327047 A1 | 11/2015 | Tiirola |
| 2015/0327240 A1 | 11/2015 | Yamada et al. |
| 2015/0334669 A1 | 11/2015 | Zhang |
| 2016/0021594 A1 | 1/2016 | Yilmaz |
| 2016/0081073 A1 | 3/2016 | Lindoff |
| 2016/0094975 A1 | 3/2016 | Sheng |
| 2016/0100401 A1 | 4/2016 | Xiong |
| 2016/0112172 A1 | 4/2016 | Seo |
| 2016/0127970 A1 | 5/2016 | Chuang |
| 2016/0143078 A1 | 5/2016 | Jeong |
| 2016/0183076 A1 | 6/2016 | Bagayoko |
| 2016/0192269 A1 | 6/2016 | Kim |
| 2016/0192426 A1 | 6/2016 | Noh |
| 2016/0205534 A1 | 7/2016 | Fujishiro |
| 2016/0212665 A1 | 7/2016 | Fukuta |
| 2016/0212721 A1 | 7/2016 | Sheng |
| 2016/0219528 A1 | 7/2016 | Kawasaki |
| 2016/0219566 A1 | 7/2016 | Jung |
| 2016/0219574 A1 | 7/2016 | Ribeiro |
| 2016/0262111 A1 | 9/2016 | Boudreau |
| 2016/0269953 A1 | 9/2016 | Jung et al. |
| 2016/0278009 A1 | 9/2016 | Sorrentino |
| 2016/0345307 A1 | 11/2016 | Huang et al. |
| 2016/0381630 A1 | 12/2016 | Krishnamoorthy |
| 2017/0071001 A1 | 3/2017 | Ahmadi |

FOREIGN PATENT DOCUMENTS

| | | |
|---|---|---|
| WO | 2013/083197 A1 | 12/2013 |
| WO | 2015/063186 A1 | 5/2015 |

OTHER PUBLICATIONS

RP-140126, 3GPP TSG-RAN WG #63, Fukuoka, Japan, Mar. 3-6, 2014, "Cover Sheet for TR 36.843 v1.2.0 on Study of LTE Device to Device Proximity Services; Radio Aspects", Qualcomm Incorporated (Rapporteur).

3GPP TR 36.843, v1.2.0, Technical Report, $3^{rd}$ Generation Partnership Project, Technical Specification Group Radio Access Network; Study of LTE Device to Device Proximity Services; Radio Aspects (Release 12) (Feb. 2014).

R2-141854, 3GPP TSG-RAN Working Group 2 meeting #85bis, "Report of 3GPP TSG RAN WG2 meting #85, Prague, Czech Republic, Feb. 10-14, 2013", ETSI MCC, Valencia, Spain, Mar. 31-Apr. 4, 2014.

3GPP TS 36.213 v12.0.0, Technical Specification, $3^{rd}$ Generation Partnership Project; Technical Specification Group Radio Access Network; Evolved Universal Terrestrial Radio Access (E-UTRA); Physical Layer Procedures (Release 12) (Dec. 2013).

R1-150954, 3GPP TSG-RAN Meeting #80, Change Request, "Correction of Discovery Signal Transmission", Ericsson, Athens, Greece, Feb. 9-13, 2015.

R1-150959, 3GPP TSG-RAN WG1 Meeting #80, Change Request, "Introduction of D2D Feature into 36.212", Huawei, Athens, Greece, Feb. 9-13, 2015.

3GPP TS 36.212 v12.3.0, Technical Specification, $3^{rd}$ Generation Partnership Project; Technical Specification Group Radio Access Network; Evolved Universal Terrestrial Radio Access (E-UTRA); Multiplexiing and Channel Coding (Release 12) (Dec. 2014).

3GPP TS 36.331 v12.4.0, Technical Specification, $3^{rd}$ Generation Partnership Project; Technical Specification Group Radio Access Network; Evolved Universal Terrestrial Radio Access (E-UTRA); Radio Resource Control (RRC) Protocol Specification (Release 12) (Dec. 2014).

FiTS User's Manual for Business Partner, Nov. 19, 2013.

R2-144223, 3GPP TSG RAN WG2 Meeting #87bis, "Further Mode 2 Switching Rules in RLF Exceptional Case", Sharp, Shanghai, China, Oct. 6-10, 2014.

R1-150899, 3GPP TSG-RAN WG1 Meeting #80, Change Request, "Introduction of ProSe", Alcatel-Lucent, Athens, Greece, Feb. 9-13, 2015.

R1-150961, 3GPP TSG-RAN Meeting #80, Change Request, "Inclusion of ProSe", Ericsson, Athens, Greece, Feb. 9-13, 2015.

R1-150962, 3GPP TSG-RAN Meeting #80, Change Request, "Introduction of D2D (ProSe) Feature into 36.213", Editor (Motorola Mobility), Athens, Greece, Feb. 9-13, 2015.

R1-150252, 3GPP TSG-RAN Meeting #80, Change Request, "Inclusion of Measurement for ProSe", Ericsson, Athens, Greece, Feb. 9-13, 2015.

R2-150645, 3GPP TSG-RAN WG2 Meeting #89, Change Request, "Corrections to Stage 2 Description of ProSe", Intel Corporation, Fujitsu, InterDigital, Huawei, HiSilicon, ZTE, Athens, Greece, Feb. 9-13, 2015.

R2-150699, 3GPP TSGRAN WG2 #89, Change Request, "Introduction of ProSe", LG Electronics Inc., Samsung, ZTE, Athens, Greece, Feb. 9-13, 2015.

R2-150700, 3GPP TSGRAN WG2 #89, Change Request, "Introduction of ProSe", Qualcomm Inc., Athens, Greece, Feb. 9-13, 2015.

(56) References Cited

OTHER PUBLICATIONS

R2-150570, 3GPP TSGRAN WG2 #89, Change Request, "Introduction of ProSe Direct Communication", Qualcomm Incorporated, Samsung, Athens, Greece, Feb. 9-13, 2015.
R2-150717, 3GPP TSGRAN WG2 #89, Change Request, "Introduction of ProSe", Ericsson, Athens, Greece, Feb. 9-13, 2015.
R2-150571, 3GPP TSGRAN WG2 #89, Change Request, "Introduction of ProSe Direct Communication", Qualcomm Incorporated, Potevio, Athens, Greece, Feb. 9-13, 2015.
R2-150734, 3GPP TSG-RAN2 #89 Meeting, Change Request, "Introduction of ProSe", Samsung, Athens, Greece, Feb. 9-13, 2015.
RP-150366, TSG-RAN Meeting #67, "CRs to 36.201, 36.211, 36.212, 36.213 & 36.214 to Introduce D2D Feature", TSG RAN WG1, Shanghai, China, Mar. 9-12, 2015,.
3GPP TS 36.201 v12.1.0, Technical Specification, $3^{rd}$ Generation Partnership Project; Technical Specification Group Radio Access Network; Evolved Universal Terrestrial Radio Access (E-UTRA); LTE Physical Layer; General Description (Release 12) (Dec. 2014).
3GPP TS 36.211 v12.4.0, Technical Specification, $3^{rd}$ Generation Partnership Project; Technical Specification Group Radio Access Network; Evolved Universal Terrestrial Radio Access (E-UTRA); Physical Channels and Modulation (Release 12) (Dec. 2014).
3GPP TS 36.214 v12.1.0, Technical Specification, $3^{rd}$ Generation Partnership Project; Technical Specification Group Radio Access Network; Evolved Universal Terrestrial Radio Access (E-UTRA); Physical Layer; Measurements (Release 12) (Dec. 2014).
3GPP TS 36.300 v12.4.0, Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; State 2 (Release 12) (Dec. 2014).
3GPP TS 36.306 v12.3.0, Technical Specification, $3^{rd}$ Generation Partnership Project; Technical Specification Group Radio Access Network; Evolved Universal Terrestrial Radio Access (E-UTRA); User Equipment (UE) Radio Access Capabilities (Release 12) (Dec. 2014).
3GPP TS 36.321 v12.4.0, Technical Specification, $3^{rd}$ Generation Partnership Project; Technical Specification Group Radio Access Network; Evolved Universal Terrestrial Radio Access (E-UTRA); Medium Access Control (MAC) Protocol Specification (Release 12) (Dec. 2014).
3GPP TS 36.322 v12.1.0, Technical Specification, $3^{rd}$ Generation Partnership Project; Technical Specification Group Radio Access Network; Evolved Universal Terrestrial Radio Access (E-UTRA); Radio Link Control (RLC) Protocol Specification (Release 12) (Sep. 2014).
3GPP TS 36.323 v12.2.0, Technical Specification, $3^{rd}$ Generation Partnership Project; Technical Specification Group Radio Access Network; Evolved Universal Terrestrial Radio Access (E-UTRA); Packet data Convergence Protocol (PDCP) Specification (Release 12) (Dec. 2014).
3GPP TS 36.304 v12.3.0, Technical Specification, $3^{rd}$ Generation Partnership Project; Technical Specification Group Radio Access Network; Evolved Universal Terrestrial Radio Access (E-UTRA); User Equipment (UE) Procedures in Idle Mode (Release 12) (Dec. 2014).
RP-150374, 3GPP TSGRAN Meeting #67, TSG RAN WG2, "RAN Agreed CRs on LTE Device to Device Proximity Services", Shanghai, China, Mar. 9-12, 2015.
U.S. Appl. No. 14/660,528, filed Mar. 17, 2015, entitled "Scheduling Wireless Device-to-Device Communications".
U.S. Appl. No. 14/660,491, filed Mar. 17, 2015, entitled "Device-to-Device Communications Apparatus and Methods".
U.S. Appl. No. 14/660,559, filed Mar. 17, 2015, entitled "Device-to-Device Communications Apparatus and Methods".
U.S. Appl. No. 14/660,587, filed Mar. 17, 2015, entitled "Device-to-Device Communications Apparatus and Methods".
U.S. Appl. No. 14/660,622, filed Mar. 17, 2015, entitled "Device-to-Device Communications Apparatus and Methods".
U.S. Appl. No. 14/749,898, filed Jun. 25, 2015, entitled "Resource Pool Access for Device to Device Communications".
U.S. Appl. No. 62/055,114, filed Sep. 25, 2014, entitled "Method and Apparatus for Unlicensed Communications Band Access".
U.S. Appl. No. 62/104,365, filed Jan. 16, 2015, entitled "Method and Apparatus for Selecting a Synchronization Signal Source for Device-To-Device Communications".
International Search Report and Written Opinion mailed Jun. 25, 2015 in PCT Application No. PCT/US2015/21034.
International Search Report and Written Opinion mailed Jul. 1, 2015 in PCT Application PCT/US2015/21030.
International Search Report and Written Opinion mailed Aug. 11, 2015 in PCT Application PCAT/US2015/21045.
International Search Report and Written Opinion mailed Jun. 25, 2015 in PCT Application No. PCT/US2015/021027.
R2-142829, 3GPP TSG-RAN2 Meeting #86, "Introduction of ProSe", Samsung, Qualcom Incorporation, Seoul, South Korea, May 19-23, 2014.
R1-141256, 3GPP TSG RAN WG1 Meeting #76bis, "Distributed Resource Allocation for D2D Communication", Alcatel-Lucent Shanghai Bell, Alcatel-Lucent, Shen Zhen, China, Mar. 31-Apr. 4, 2014.
R1-141546, 3GPP TSG RAN WG1 Meeting #76bis, Discussion on D2D Operation Outside of Network Coverage (Mode-2), Intel Corporation, Shenzhen, China, Mar. 31-Apr. 4, 2014.
R1-141859, 3GPP TSG RAN WG1 Meeting #76bis, "Way Forward on Discovery Signal Design and Network Assistance", NTT DOCOMO, Huawei, HiSilicon, Samsung, Sony, Sharp, ZTE, LG Electronics, Hitachi, ETRI, Media Tek, Shenzhen, China, Mar. 31-Apr. 4, 2014.
3GPP TS 23.303 V12.0.0 Technical Specification, $3^{rd}$ Generation Partnership Project; Technical Specification Group Services and Systems Aspects; Proximity-based Services (ProSe); Stage 2 (Release 12) (Dec. 2014).
R2-14XXX, 3GPP TSG RAN WG1 Meeting #87, Introduction of ProSe, Samsun, Dresden, German, Aug. 18-22, 2014.
International Search Report and Written Opinion mailed Oct. 23, 2015 in PCT Application PCT/US15/43784.
Final Office Action mailed Apr. 5, 2017 in U.S. Appl. No. 14/660,491.
R1-142409 3GPP TSG RAN WG1 Meeting #77, Ericsson, "Synchronization Signals and Channel Design for D2D", Seoul, Korea, May 19-23, 2014.
R1-142340 3GPP TSG RAN WG1 Meeting #77, Huawei, HiSilicon, "D2DSS Design", Seoul, Korea, May 19-23, 2014.
R1-133598 3GPP TSG-RAN WG1 #74 Qualcomm Inc., "Techniques for Synchronization", Barcelona, Spain, Aug. 19-23, 2013.
3GPP TR 36.843 V12.0.1, Technical Report; $3^{rd}$ Generation Partnership Project; Technical Specification Group Radio to Access Network; Study on LTE Device to Device Proximity Services; Radio Aspects (Release 12) (Mar. 2014).
3GPP TSG RAN WG1 #76BIS, "Chairman's notes", Shenzhen, China, Mar. 31-Apr. 4, 2014.
3GPP TSG RAN WG1 Meeting #77, "Chairman's notes", Seoul, Korea, May 19-23, 2014.
R1-142452 3GPP TSG-RAN WG1 Meeting #77, Nokia, NSN, "D2D Synchronization Signal Design", Seoul, Korea, May 19-23, 2014.
R1-141974 3GPP TSG-RAN WG1 #77, Qualcomm Incorporated, "Signal Design for D2D Synchronization", Seoul, Korea, May 19-23, 2014.
R1-135316 3GPP TSG-RAN WG1 #75, Qualcomm Incorporated, "Multi-hop D2D Synchronization Performance", San Francisco USA, Nov. 11-15, 2013.
Office Action mailed Sep. 22, 2016 in U.S. Appl. No. 14/660,528.
Office Action mailed Jan. 18, 2017 in U.S. Appl. No. 14/660,528.
Office Action mailed Nov. 18, 2016 in U.S. Appl. No. 14/660,491.
International Preliminary Report on Patentability mailed Nov. 17, 2016 in PCT Application PCT/US2015/021045.
Office Action mailed Oct. 17, 2016 in U.S. Appl. No. 14/660,622.
Final Office Action mailed Sep. 30, 2016 in U.S. Appl. No. 14/660,587.
Office Action mailed Jun. 10, 2016 in U.S. Appl. No. 14/660,587.
Advisory Action mailed May 10, 2016 in U.S. Appl. No. 14/660,587.
Final Office Action mailed Mar. 2, 2016 in U.S. Appl. No. 14/660,587.

(56) References Cited

OTHER PUBLICATIONS

Office Action mailed Oct. 5, 2015 in U.S. Appl. No. 14/660,587.
Office Action mailed Sep. 30, 2016 in U.S. Appl. No. 14/660,559.
International Search Report and Written Opinion mailed Jun. 25, 2015 in PCT Application No. PCT/US2015/21041.
International Preliminary Report on Patentability mailed Nov. 1, 2016 in PCT Application No. PCT/US2015/021041.
International Preliminary Report on Patentability mailed Feb. 7, 2017 in PCT Application PCT/US15/43784.
Final Office Action dated Apr. 21, 2017 in U.S. Appl. No. 14/660,587.
Final Office Action dated Feb. 28, 2017 in U.S. Appl. No. 14/660,559.
Advisory Action dated Jun. 14, 2017 in U.S. Appl. No. 14/660,559.
R2-152168, 3GPP TSG-RAN WG2 Meeting #90, Intel Corporation, "Priority Handling for ProSe", Fukuoka, Japan, May 25-29, 2015.
R2-144812, 3GPP TSG RAN Wg2 #88, Acer Incorporated, "Cell Reselection Priority with ProSe Communication", San Francisco, USA, Nov. 17-21, 2014.
R2-142631, 3GPP TSG-RAN WG2 #86, "Prioritized Reselection of D2D Supported Frequency", Seoul, Korea, May 19-23, 2014.
Advisory Action dated Jun. 23, 2017 in U.S. Appl. No. 14/660,491.
Advisory Action dated Dec. 14, 2016 in U.S. Appl. No. 14/660,587.
Office Action dated Jan. 18, 2017 in U.S. Appl. No. 14/660,587.
Office Action dated Jul. 27, 2017 in U.S. Appl. No. 14/660,528.
Office Action dated Sep. 12, 2017 in U.S. Appl. No. 14/660,559.
Office Action dated Sep. 12, 2017 in U.S. Appl. No. 14/660,491.
Supplementary EP Search Report dated Oct. 16, 2017 in EP application 15764859.3.

* cited by examiner

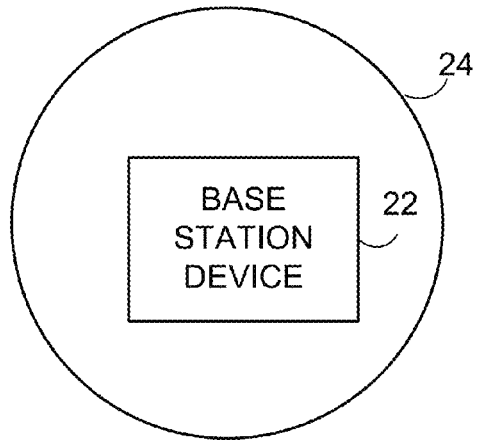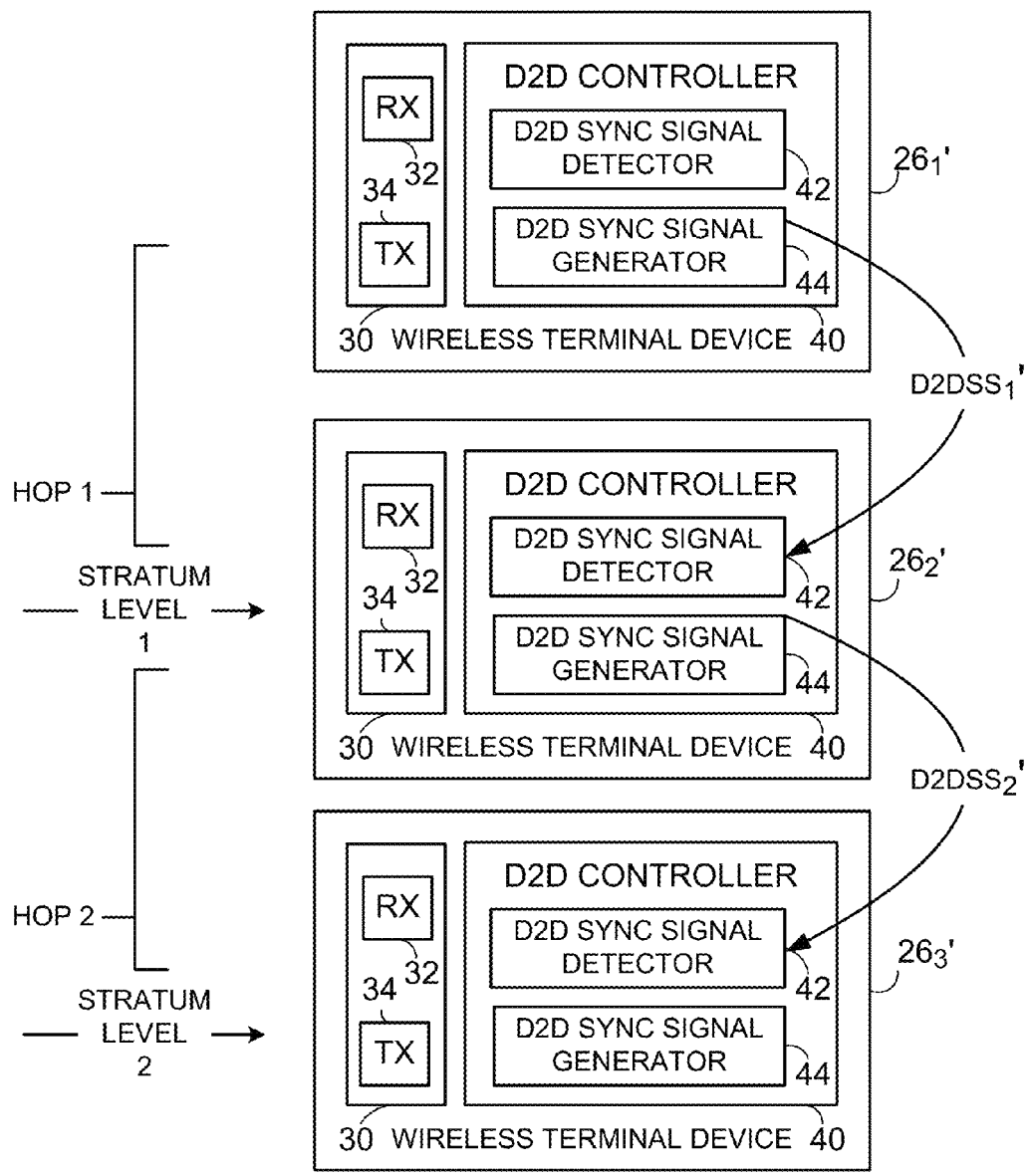
Fig. 1B

SET(S) OF SEQUENCES FROM WHICH THE DEVICE-
TO-DEVICE (D2D) SYNCHRONIZATION SIGNAL
D2DSS IS SELECTED OR CONSTRUCTED

SET(S) OF SEQUENCES FROM WHICH THE DEVICE-
TO-DEVICE (D2D) SYNCHRONIZATION SIGNAL
D2DSS IS SELECTED OR CONSTRUCTED

SET(S) OF SEQUENCES FROM WHICH THE DEVICE-
TO-DEVICE (D2D) SYNCHRONIZATION SIGNAL
D2DSS IS SELECTED OR CONSTRUCTED

Fig. 7A

DEVICE-TO-DEVICE (D2D) SYNCHRONIZATION SIGNAL (D2DSS)

| FIRST SEQUENCE: SELECTED TO REPRESENT STRATUM LEVEL | SECOND SEQUENCE |
|---|---|

Fig. 7B

DEVICE-TO-DEVICE (D2D) SYNCHRONIZATION SIGNAL (D2DSS)

| FIRST SEQUENCE | SECOND SEQUENCE: SELECTED TO REPRESENT STRATUM LEVEL |
|---|---|

Fig. 7C

DEVICE-TO-DEVICE (D2D) SYNCHRONIZATION SIGNAL (D2DSS)

| FIRST SEQUENCE | SECOND SEQUENCE: SELECTED TO REPRESENT STRATUM LEVEL |
|---|---|

SECOND SET OF SEQUENCES

| PARTITION 1 FOR STRATUM 1 | PARTITION 2 FOR STRATUM 2 | ... | PARTITION y FOR STRATUM y |
|---|---|---|---|

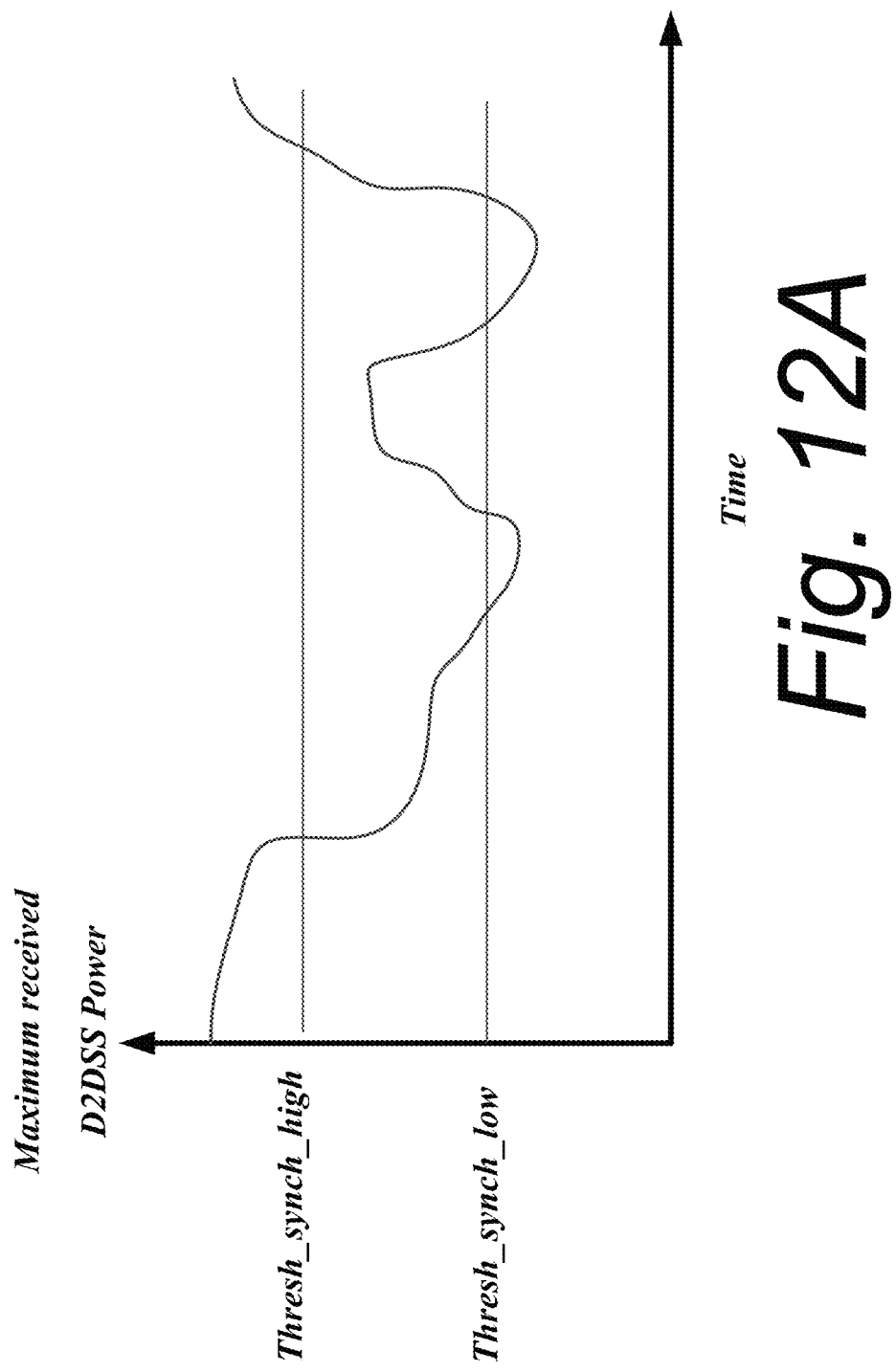

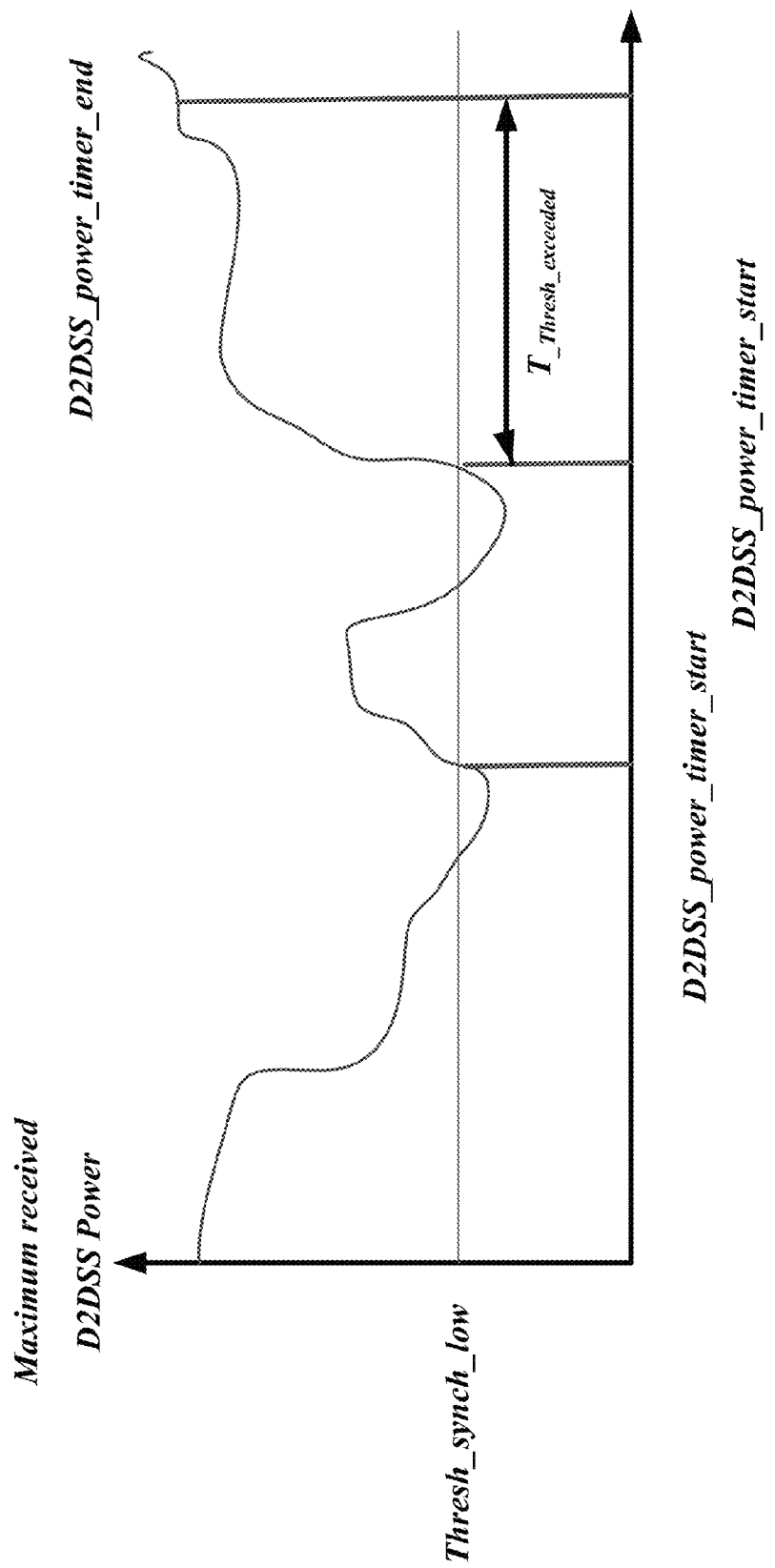

SYNCHRONIZATION SIGNALS FOR DEVICE-TO-DEVICE COMMUNCATIONS

This application claims the priority and benefit of U.S. Provisional Patent application 62/034,125, filed Aug. 6, 2014, entitled "SYNCHRONIZATION SIGNALS FOR DEVICE-TO-DEVICE COMMUNICATIONS", which is incorporated herein by reference.

TECHNICAL FIELD

The technology relates to wireless communications, and particularly to generation/transmission and reception/decoding of synchronization signals for wireless device-to-device (D2D) communications.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "wide area network" ("WAN") or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and/or data traffic (referred to herein as "communication signals") from one user equipment terminal to one or more other user equipment terminals may not be communicated through a base station or other network control device of a telecommunication system. Device-to-device (D2D) communication has more recently also become known as "sidelink direct communication" or even "sidelink" communications, and accordingly is sometimes abbreviated as "SLD" or "SL". As such, device-to-device (D2D), sidelink direct, and sidelink are used interchangeably herein but all have the same meaning.

Various aspects of sidelink direct communications are described in one or more of the following, all of which are incorporated herein by reference in their entirety:

U.S. patent application Ser. No. 14/660,528, filed Mar. 17, 2015;
U.S. patent application Ser. No. 14/660,491, filed Mar. 17, 2015;
U.S. patent application Ser. No. 14/660,559, filed Mar. 17, 2015;
U.S. patent application Ser. No. 14/660,587, filed Mar. 17, 2015;
U.S. patent application Ser. No. 14/660,622, filed Mar. 17, 2015;
U.S. patent application Ser. No. 14/749,898, filed Jun. 25, 2015;
U.S. Provisional Patent application 62/055,114, filed Sep. 25, 2014;
U.S. Provisional Patent application 62/104,365, filed Jan. 16, 2015;

What is needed therefore, and an object of the technology disclosed herein, are apparatus, methods, and techniques for carrying sufficient synchronization information for D2D communications using a D2D synchronization signal.

SUMMARY

A user equipment (UE) may comprise a detector which is configured to detect a first sidelink synchronization signal. The user equipment (UE) may comprise a receiver which is configured to receive a physical sidelink channel. The physical sidelink channel may carry information specifying whether or not a source of the first sidelink synchronization signal is in-coverage. The first sidelink synchronization signal may be generated by using at least a first identity.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 1B is a schematic view of an example generic embodiment of a radio communications network in which an out-of-coverage device-to-device (D2D) wireless terminal serves as a timing reference source for device-to-device (D2D) communications.

FIG. 7A-FIG. 7C are diagrammatic views depicting various manners of constructing a device-to-device synchronization from plural sequences, including example embodiments wherein each of the different sequences is utilized to express different information.

FIG. 12A and FIG. 12B are graphs showing hysteresis techniques for device-to-device (D2D) synchronization signaling.

DETAILED DESCRIPTION

Figure 1A:
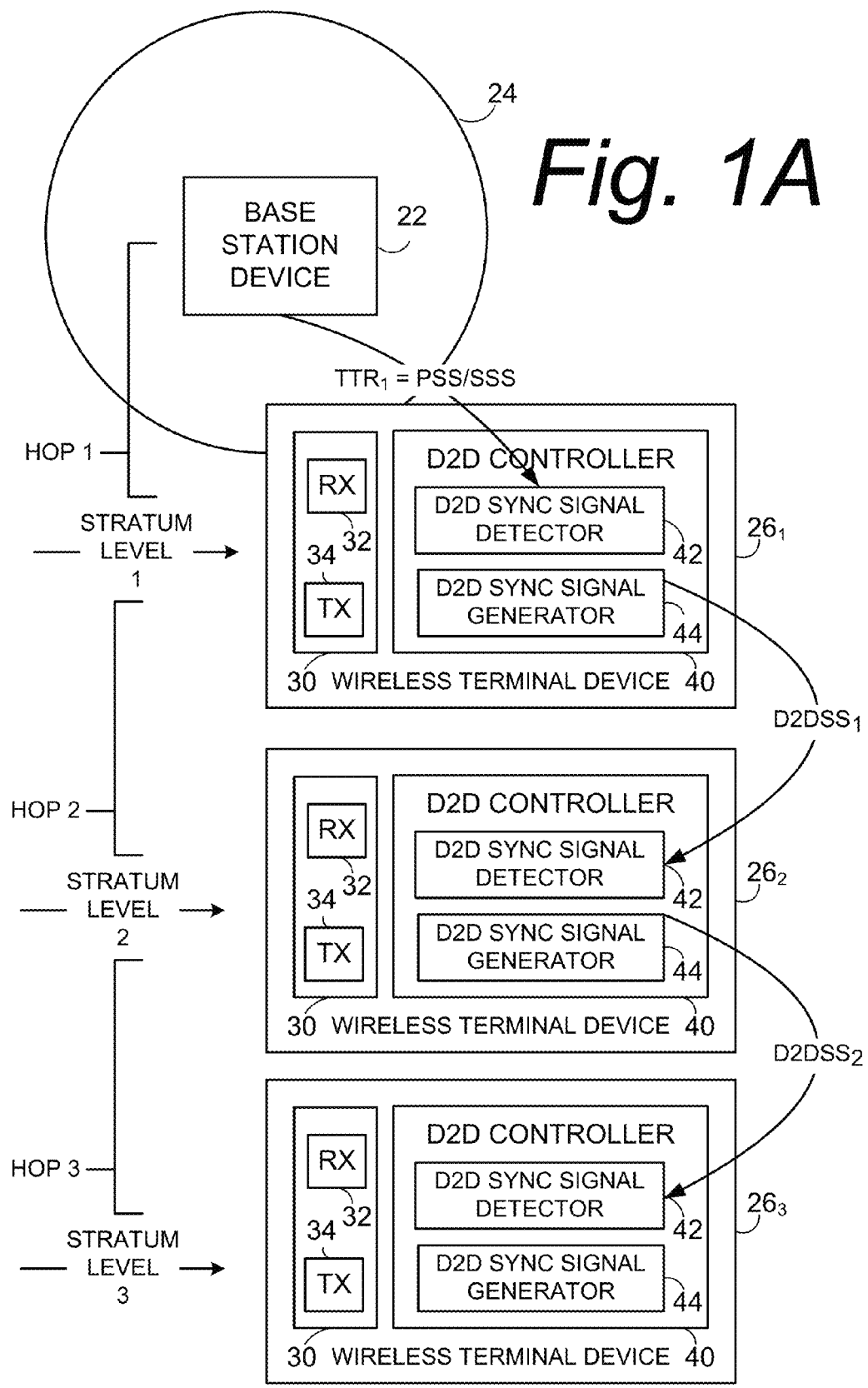
FIG. 1A is a schematic view of an example generic embodiment of a radio communications network in which a radio access node serves as a timing reference source for device-to-device (D2D) communications by virtue of a device-to-device (D2D) wireless terminal being in network coverage.

D2D communication (also known as sidelink direct communications) can be used in networks implemented according to any suitable telecommunications standard. A non-limiting example of such as standard is the 3rd Generation Partnership Project ("3GPP") Long Term Evolution ("LTE"). The 3GPP LTE is the name given to a project to improve the Universal Mobile Telecommunications System ("UMTS") mobile phone or device standard to cope with future requirements. The 3GPP standard is a collaboration agreement that aims to define globally applicable technical specifications and technical reports for third and fourth generation wireless communication systems. The 3GPP may define specifications for next generation mobile networks, systems, and devices. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which D2D communication may be used.

Again it is mentioned that device-to-device (D2D), sidelink direct, and sidelink are used interchangeably herein but all have the same meaning. Device to device (D2D) communications provide, for example, proximity-based applications and services, representing an emerging social-technological trend. The introduction of a Proximity Services (ProSe) capability in LTE allows the 3GPP industry to serve this developing market, and, at the same time, serve the urgent needs of several Public Safety communities that are jointly committed to LTE. The current assumptions related to D2D communication is that a wireless terminal within network coverage uses resources for D2D discovery and communication assigned by the controlling node. If the wireless terminal is out of network coverage, it may use pre-assigned resources for communications. If the wireless terminal incorrectly determines its situation of in/out of network coverage, e.g., if the wireless terminal tries to use the pre-assigned resources within network coverage, it may affect the current LTE networks with strong interference and thereby be very dangerous.

In legacy LTE networks, at the physical layer, the UE needs to determine time and frequency parameters that are necessarily to demodulate the downlink and to transmit uplink signals with the correct timing by a series of synchronization procedures. Legacy LTE synchronization signals are described below. Legacy LTE synchronization signals comprise a primary synchronization signal (PSS), which is a sequence generated from a frequency-domain Zadoff-Chu sequence, and a secondary synchronization signal (SSS), which is an interleaved concatenation of two sequences which are then scrambled with a scrambling sequence. A combination of PSS and SSS is used to signify a physical-layer cell identity which is an identifier of the source (e.g., base station) of the synchronization signal.

For synchronization signals, there may be 504 unique physical-layer cell identities. The physical-layer cell identities may be grouped into 168 unique physical-layer cell-identity groups, each group containing three unique identities. The grouping may be such that each physical-layer cell identity is part of one and only one physical-layer cell-identity group. A physical-layer cell identity $N_{ID}^{cell} = 3N_{ID}^{(1)} + N_{ID}^{(2)}$ may be thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group.

For sequence generation of primary synchronization signal, the sequence d(n) used for the primary synchronization signal may be generated from a frequency-domain Zadoff-Chu sequence according to $$d_u(n) = \begin{cases} e^{-j\frac{\pi u n(n+1)}{63}} & n = 0, 1, \ldots 30 \\ e^{-j\frac{\pi u(n+1)(n+2)}{63}} & n = 31, 32, \ldots 61 \end{cases}$$

where the Zadoff-Chu root sequence index u may be given by Table 1.

TABLE 1

| $N_{ID}^{(2)}$ | Root index u |
|---|---|
| 0 | 25 |
| 1 | 29 |
| 2 | 34 |

For mapping of primary synchronization signal to resource elements, the mapping of the sequence to resource elements may depend on the frame structure. The UE may not assume that the primary synchronization signal is transmitted on the same antenna port as any of the downlink reference signals. The UE may not assume that any transmission instance of the primary synchronization signal is transmitted on the same antenna port, or ports, used for any other transmission instance of the primary synchronization signal. The sequence d(n) may be mapped to the resource elements according to $$a_{k,l} = d(n), n = 0, \ldots, 61$$

$$k = n - 31 + \frac{N_{RB}^{DL} N_{sc}^{RB}}{2},$$

where $N_{sc}^{RB}$ denotes a resource block size in the frequency domain, expressed as a number of subcarriers and $N^{DL}_{RB}$ denotes a downlink bandwidth configuration, expressed in multiples of $N^{RB}_{sc}$. For frame structure type 1, the primary synchronization signal may be mapped to the last OFDM symbol in slots 0 and 10. For frame structure type 2, the primary synchronization signal may be mapped to the third OFDM symbol in subframes 1 and 6. Resource elements (k,l) in the OFDM symbols used for transmission of the primary synchronization signal where $$k = n - 31 + \frac{N^{DL}_{RB} N^{RB}_{sc}}{2}$$
$$n = -5, -4, \ldots, -1, 62, 63, \ldots 66$$

may be reserved and may not be used for transmission of the primary synchronization signal.

For sequence generation of secondary synchronization signal, the sequence d(0), . . . , d(61) used for the second synchronization signal may be an interleaved concatenation of two length-31 binary sequences. The concatenated sequence may be scrambled with a scrambling sequence given by the primary synchronization signal. The combination of two length-31 sequences defining the secondary synchronization signal may differ between subframe 0 and subframe 5 according to $$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

where $0 \leq n \leq 30$. The indices $m_0$ and $m_1$ may be derived from the physical-layer cell-identity group $N_{ID}^{(1)}$ according to $$m_0 = m' \bmod 31$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor,$$
$$q' = \lfloor N_{ID}^{(1)}/30 \rfloor$$

where the output of the above expression may be listed in Table 2.

The two sequences $s_0^{(m_0)}(n)$ and $s_1^{(m_1)}$ may be defined as two different cyclic shifts of the m-sequence $\tilde{s}(n)$ according to $$s_0^{(m_0)}(n) = \tilde{s}((n+m_0) \bmod 31)$$

$$s_1^{(m_1)}(n) = \tilde{s}((n+m_1) \bmod 31)$$

where $\tilde{s}(i) = 1 - 2x(i)$, $0 \leq i \leq 30$, may be defined by $$x(\bar{i}+5) = (x(\bar{i}+2) + x(\bar{i})) \bmod 2, \quad 0 \leq \bar{i} \leq 25$$

with initial conditions x(0)=0, x(1)=0, x(2)=0, x(3)=0, x(4)=1.

The two scrambling sequences $c_0(n)$ and $c_1(n)$ may depend on the primary synchronization signal and may be defined by two different cyclic shifts of the m-sequence $\tilde{c}(n)$ according to $$c_0(n) = \tilde{c}((n+N_{ID}^{(2)}) \bmod 13)$$

$$c_1(n) = \tilde{c}((n+N_{ID}^{(2)}+3) \bmod 31)$$

where $N_{ID}^{(2)} \in \{0,1,2\}$ may be the physical-layer identity within the physical-layer cell identity group $N_{ID}^{(1)}$ and $\tilde{c}(i) = 1 - 2x(i)$, $0 \leq i \leq 30$, may be defined by $$x(\bar{i}+5) = (x(\bar{i}+3) + x(\bar{i})) \bmod 2, \quad 0 \leq \bar{i} \leq 25$$

with initial conditions x(0)=0, x(1)=0, x(2)=0, x(3)=0, x(4)=1.

The scrambling sequences $z_1^{(m_0)}(n)$ and $z_1^{(m_1)}(n)$ may be defined by a cyclic shift of the m-sequence $\tilde{z}(n)$ according to $$z_1^{(m_0)}(n) = \tilde{z}((n+(m_0 \bmod 8)) \bmod 31)$$

$$z_1^{(m_1)}(n) = \tilde{z}((n+(m_1 \bmod 8)) \bmod 31)$$

where $m_0$ and $m_1$ may be obtained from Table 2 and $\tilde{z}(i) = 1 - 2x(i)$, $0 \leq i \leq 30$, may be defined by $$x(\bar{i}+5) = (x(\bar{i}+4) + x(\bar{i}+2) + x(\bar{i}+1) + x(\bar{i})) \bmod 2, \quad 0 \leq \bar{i} \leq 25$$

with initial conditions x(0)=0, x(1)=0, x(2)=0, x(3)=0, x(4)=1.

TABLE 2

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |

TABLE 2-continued

| $N_{ID}^{(1)}$ | $m_0$ | $m_1$ |
|---|---|---|
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

For mapping of secondary synchronization signal to resource elements, the mapping of the sequence to resource elements may depend on the frame structure. In a subframe for frame structure type 1 and in a half-frame for frame structure type 2, the same antenna port as for the primary synchronization signal may be used for the secondary synchronization signal. The sequence d(n) may be mapped to resource elements according to $$a_{k,l} = d(n), n = 0, \ldots, 61$$

$$k = n - 31 + \frac{N_{RB}^{DL} N_{sc}^{RB}}{2}$$

$$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases},$$

where $N_{symb}^{DL}$ denotes the number of OFDM symbols in a downlink slot. Resource elements (k,l) where $$k = n - 31 + \frac{N_{RB}^{DL} N_{sc}^{RB}}{2}$$

-continued $$l = \begin{cases} N_{symb}^{DL} - 2 & \text{in slots 0 and 10 for frame structure type 1} \\ N_{symb}^{DL} - 1 & \text{in slots 1 and 11 for frame structure type 2} \end{cases}$$

$$n = -5, -4, \ldots, -1, 62, 63, \ldots 66$$

may be reserved and may not be used for transmission of the secondary synchronization signal.

For a D2D scheme, because of the existing out of coverage communications, the synchronization source may not necessarily be an eNodeB. In fact, the synchronization source may instead be a wireless terminal (UE). Moreover, synchronization signals from different sources (e.g., eNodeB or UEs) may be relayed to other UEs, e.g., through a series of hops or stratum levels. Different numbers of relays (hops) may cause different timing accuracy. For example, with increasing number of hops the accuracy of the synchronization signal may become increasingly suspect.

A wireless terminal (UE) participating in D2D communications may receive multiple synchronization signals, and needs to choose an appropriate and accurate synchronization signal to use for its own timing. That is, the wireless terminal needs to distinguish such information when receiving multiple synchronization signals, so as to get correct timing for communications, especially for an out of coverage scenario.

Discussion is currently ongoing as to what kind of information should be carried by D2D synchronization signal (D2DSS (also known as sidelink synchronization signal (SLSS))), e.g., whether a particular physical D2D synchronization channel (PD2DSCH) is needed; and, if it is needed, what kind of information should be carried by PD2DSCH. As the synchronization signal (SS) itself cannot carry any information bits and has limited capability to indicate information, employment of a PD2DSCH as a kind of physical sidelink channel is plausible, especially for out of coverage scenario. However, it would be preferable to save PD2DSCH information bits for both transmission and reception, and thereby also save energy.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

In one of its aspects the technology disclosed herein concerns a user equipment (UE). In an example embodiment the UE may comprise: a receiver configured to detect a first sidelink synchronization signal; and a controller configured to acquire, from a physical sidelink channel, information specifying whether or not a source of the first sidelink synchronization signal is in-coverage; wherein the first sidelink synchronization signal is generated by using at least a first identity.

In an example embodiment the first sidelink synchronization signal may be generated by further using a second identity. A range of the first identity may be [0, 1], and a range of the second identity may be [0-167].

In an example embodiment the value "0" of the first identity may correspond to in-coverage and the value "1" of the first identity may correspond to out-of-coverage.

In an example embodiment a root index of a sequence for the first sidelink synchronization signal may be determined by using at least the first identity.

In an example embodiment the user equipment (UE) may further comprise: a generator configured to generate a second sidelink synchronization signal; and a transmitter configured to transmit the physical sidelink channel which carries information specifying whether or not the user equipment (UE) is in-coverage; wherein the second sidelink synchronization signal is generated by using at least the first identity.

In an example embodiment the user equipment (UE) may comprise: a generator configured to generate a sidelink synchronization signal; and a transmitter configured to transmit a physical sidelink channel which carries information specifying whether or not the user equipment (UE) is in-coverage; wherein the sidelink synchronization signal is generated by using at least a first identity.

In an example embodiment the sidelink synchronization signal may be generated by further using a second identity. A range of the first identity may be [0, 1], and a range of the second identity may be [0-167].

In an example embodiment the value "0" of the first identity may correspond to in-coverage and the value "1" of the first identity may correspond to out-of-coverage.

In an example embodiment a root index of a sequence for the sidelink synchronization signal may be determined by using at least a first identity.

In an example embodiment a method in a user equipment (UE), which may comprise: receiving a first sidelink synchronization signal; and acquiring from a physical sidelink channel information specifying whether or not a source of the first sidelink synchronization signal is in-coverage; wherein the first sidelink synchronization signal is generated by using at least a first identity.

In an example embodiment the method may further comprise: generating a second sidelink synchronization signal; and transmitting the physical sidelink channel which carries information specifying whether or not the UE is in-coverage; wherein the second sidelink synchronization signal is generated by using at least the first identity.

In an example embodiment a method in a user equipment (UE) may comprise: generating a sidelink synchronization signal; and transmitting a physical sidelink channel which carries information specifying whether or not the user equipment (UE) is in-coverage; wherein the sidelink synchronization signal is generated by using at least a first identity.

In an example embodiment a UE may comprise: a receiver configured to measure a sidelink received power; and a transmitter configured to transmit a synchronization signal if the sidelink received power is below a threshold.

In an example embodiment a method in a UE may comprise: measuring a sidelink received power; and transmitting a synchronization signal if the sidelink received power is below a threshold.

In another one of its aspects the technology disclosed herein concerns a wireless terminal device capable of transmitting device-to-device communications to a receiving wireless terminal device when the wireless terminal device is or in not within coverage of a base station of a radio access network. In an example embodiment the wireless terminal device may comprise processor circuitry and a transmitter. The processor circuitry may be configured to generate a device-to-device synchronization signal which is configured to express: (1) timing information based on a transmission timing reference; (2) device-to-device synchronization source information of the wireless terminal device; and (3) a stratum level of the wireless terminal device. The stratum level may indicate relative device position of the wireless terminal device in a consecutive chain of devices from a timing reference source. The transmitter may be configured to transmit the device-to-device synchronization signal to the receiving wireless terminal.

In an example embodiment and mode the device-to-device synchronization signal may comprise a sequence selected from a set of plural sequences.

In an example embodiment and mode the set of plural sequences may be subdivided based on stratum level.

In an example embodiment and mode the set of plural sequences may be subdivided based on whether the timing reference is originally from a base station device of the radio access network.

In an example embodiment and mode the set of plural sequences may be subdivided based on (1) whether the timing reference is originally from a base station device of the radio access network, and (2) whether the timing reference is not originally from a base station device of the radio access network.

In an example embodiment and mode the device-to-device synchronization signal may comprise a sequence selected from a set of plural sequences, and each of the plural sequences of the set have a different root.

In an example embodiment and mode the set of plural sequences may comprise a set of sequences from which a primary synchronization signal (PSS) is selected for use by a base station device of the radio access network.

In an example embodiment and mode the processor circuitry may be configured to generate plural instances of the device-to-device synchronization signal in a time domain within a frame, and an interval between the plural instances indicates the stratum level.

In an example embodiment and mode the device-to-device synchronization signal may comprise a first sequence and a second sequence selected respectively from a first set of plural sequences and a second set of plural sequences selected from a set of plural sequences. In an example implementation, the first sequence may be selected to indicate the stratum level. In an example implementation, each of the plural sequences of the first set may have a different root. In an example implementation the first set of plural sequences may comprise a set of sequences from which a primary synchronization signal (PSS) may be selected for use by a base station device of the radio access network. In an example implementation the second set of plural sequences may comprise a set of sequences from which a secondary synchronization signal (SSS) is selected for use by a base station device of the radio access network.

In an example embodiment and mode the second sequence may be selected from the second set of sequences in a manner to indicate the stratum level.

In an example embodiment and mode the second set of plural sequences may be partitioned into plural ranges, and wherein each of the plural ranges indicates a different stratum level.

In an example embodiment and mode the second set of plural sequences may comprise a set of sequences from which a secondary synchronization signal (SSS) is selected for use by a base station device of the radio access network.

In an example embodiment and mode a spacing of the first sequence and the second sequence within a frame may indicate the stratum level.

In another of its aspects the technology disclosed herein concerns a method in a wireless terminal device capable of transmitting device-to-device communications to a receiving wireless terminal device when the wireless terminal device is or in not within coverage of a base station of a radio access network. In an example embodiment and mode the method may comprise generating a device-to-device synchronization signal; and transmitting the device-to-device synchronization signal to the receiving wireless terminal. The device-to-device synchronization signal may be configured to express: (1) timing information based on a transmission timing reference; (2) device-to-device synchronization source information of the wireless terminal device; and (3) a stratum level of the wireless terminal device, the stratum level indicating relative device position of the wireless terminal device in a consecutive chain of devices from a timing reference source.

In an example embodiment and mode the device-to-device synchronization signal may comprise a sequence selected from a set of plural sequences.

In an example embodiment and mode the set of plural sequences may be subdivided based on stratum level.

In an example embodiment and mode the set of plural sequences may be subdivided based on whether the timing reference is originally from a base station device of the radio access network.

In an example embodiment and mode the set of plural sequences may be subdivided based on (1) whether the timing reference is originally from a base station device of the radio access network, and (2) whether the timing reference is originally from a base station device of the radio access network.

In an example embodiment and mode each of the plural sequences of the set may have a different root.

In an example embodiment and mode the set of plural sequences may comprise a set of sequences from which a primary synchronization signal (PSS) is selected for use by a base station device of the radio access network.

In an example embodiment and mode the method may further comprise generating plural instances of the device-to-device synchronization signal in a time domain within a frame, and wherein an interval between the plural instances indicates the stratum level.

In an example embodiment and mode the device-to-device synchronization signal may comprise a first sequence and a second sequence selected respectively from a first set of plural sequences and a second set of plural sequences selected from a set of plural sequences.

In an example embodiment and mode the first sequence may be selected to indicate the stratum level.

In an example embodiment and mode each of the plural sequences of the first set may have a different root.

In an example embodiment and mode the second set of plural sequences may comprise a set of sequences from which a secondary synchronization signal (SSS) is selected for use by a base station device of the radio access network.

In an example embodiment and mode the second sequence may be selected from the second set of sequences in a manner to indicate the stratum level.

In an example embodiment and mode the second set of plural sequences may be partitioned into plural ranges, and wherein each of the plural ranges indicates a different stratum level.

In an example embodiment and mode the second set of plural sequences may comprise a set of sequences from which a secondary synchronization signal (SSS) is selected for use by a base station device of the radio access network.

In an example embodiment and mode a spacing of the first sequence and the second sequence within a frame may indicate the stratum level.

In another of its aspects the technology disclosed herein concerns a wireless terminal device capable of receiving device-to-device communications from a transmitting device when the wireless terminal device is or in not within coverage of a base station of a radio access network. In an example embodiment and mode the wireless terminal device may comprise a receiver configured to receive the device-to-device synchronization signal from the transmitting device; and, processor circuitry configured to detect the device-to-device synchronization signal and to obtain therefrom: (1) timing information based on a transmission timing reference; (2) device-to-device synchronization source information of the transmitting device; and (3) a stratum level of the transmitting device. The stratum level may indicate relative device position of the transmitting device in a consecutive chain of devices from a timing reference source.

In an example embodiment and mode the device-to-device synchronization signal may comprise a sequence selected from a set of plural sequences In an example embodiment and mode the set of plural sequences may be subdivided based on stratum level.

In an example embodiment and mode the set of plural sequences may be subdivided based on whether the timing reference is originally from a base station device of the radio access network.

In an example embodiment and mode the set of plural sequences may be subdivided based on (1) whether the timing reference is originally from a base station device of the radio access network, and (2) whether the timing reference is not originally from a base station device of the radio access network.

In an example embodiment and mode each of the plural sequences of the set may have a different root.

In an example embodiment and mode the set of plural sequences may comprise a set of sequences from which a primary synchronization signal (PSS) is selected for use by a base station device of the radio access network.

In an example embodiment and mode the processor circuitry may be configured to detect plural instances of the device-to-device synchronization signal in a time domain within a frame, and wherein an interval between the plural instances indicates the stratum level.

In an example embodiment and mode the device-to-device synchronization signal may comprise a first sequence and a second sequence selected respectively from a first set of plural sequences and a second set of plural sequences selected from a set of plural sequences.

In an example embodiment and mode the first sequence may be selected to indicate the stratum level.

In an example embodiment and mode each of the plural sequences of the first set may have a different root.

In an example embodiment and mode the first set of plural sequences may comprise a set of sequences from which a primary synchronization signal (PSS) is selected for use by a base station device of the radio access network.

In an example embodiment and mode the second set of plural sequences may comprise a set of sequences from which a secondary synchronization signal (SSS) is selected for use by a base station device of the radio access network.

In an example embodiment and mode the second sequence may be selected from the second set of sequences in a manner to indicate the stratum level.

In an example embodiment and mode the second set of plural sequences may be partitioned into plural ranges, and wherein each of the plural ranges indicates a different stratum level.

In an example embodiment and mode the second set of plural sequences may comprise a set of sequences from which a secondary synchronization signal (SSS) is selected for use by a base station device of the radio access network.

In an example embodiment and mode a spacing of the first sequence and the second sequence within a frame may indicate the stratum level.

In an example embodiment and mode the processor circuitry may be further configured to determine whether to use the device-to-device synchronization signal as a timing signal for the wireless terminal.

In an example embodiment and mode the processor circuitry may be further configured to determine whether to use the device-to-device synchronization signal as a timing signal for the wireless terminal based on received signal quality of the device-to-device synchronization signal and the stratum level.

In an example embodiment and mode the processor circuitry may be further configured to generate a further device-to-device synchronization signal, the further device-to-device synchronization signal being configured to express: (1) the timing information; (2) device-to-device synchronization source information of the wireless terminal device; and (3) a stratum level of the wireless terminal; and further comprising a transmitter configured to transmit the further device-to-device synchronization signal to a further wireless terminal device.

In another of its aspects the technology disclosed herein concerns a wireless terminal device capable of receiving device-to-device communications from a transmitting device when the wireless terminal device is or in not within coverage of a base station of a radio access network. In an example embodiment and mode the method may comprise receiving from the transmitting device a device-to-device synchronization signal which is configured to express: (1) timing information based on a transmission timing reference; (2) device-to-device synchronization source information of the wireless terminal device; and (3) a stratum level of the wireless terminal device, the stratum level indicating relative device position of the wireless terminal device in a consecutive chain of devices from a timing reference source; and detecting the device-to-device synchronization signal to obtain: (1) the timing information based on the transmission timing reference; (2) the device-to-device synchronization source information of the transmitting device; and (3) the stratum level of the transmitting device, the stratum level.

In an example embodiment and mode the device-to-device synchronization signal may comprise a sequence selected from a set of plural sequences.

In an example embodiment and mode the set of plural sequences may be subdivided based on stratum level.

In an example embodiment and mode the set of plural sequences may be subdivided based on whether the timing reference is originally from a base station device of the radio access network.

In an example embodiment and mode the set of plural sequences may be subdivided based on (1) whether the timing reference is originally from a base station device of the radio access network, and (2) whether the timing reference is not originally from a base station device of the radio access network.

In an example embodiment and mode each of the plural sequences of the set may have a different root.

In an example embodiment and mode the set of plural sequences may comprise a set of sequences from which a primary synchronization signal (PSS) is selected for use by a base station device of the radio access network.

In an example embodiment and mode the method may further comprise obtaining plural instances of the device-to-device synchronization signal in a time domain within a frame, and wherein an interval between the plural instances indicates the stratum level.

In an example embodiment and mode the device-to-device synchronization signal may comprise a first sequence and a second sequence selected respectively from a first set of plural sequences and a second set of plural sequences selected from a set of plural sequences.

In an example embodiment and mode the first sequence may be selected to indicate the stratum level.

In an example embodiment and mode each of the plural sequences of the first set may have a different root.

In an example embodiment and mode the first set of plural sequences may comprise a set of sequences from which a primary synchronization signal (PSS) is selected for use by a base station device of the radio access network.

In an example embodiment and mode the second set of plural sequences may comprise a set of sequences from which a secondary synchronization signal (SSS) is selected for use by a base station device of the radio access network.

In an example embodiment and mode the second sequence may be selected from the second set of sequences in a manner to indicate the stratum level.

In an example embodiment and mode the second set of plural sequences may be partitioned into plural ranges, and wherein each of the plural ranges indicates a different stratum level.

In an example embodiment and mode the second set of plural sequences may comprise a set of sequences from which a secondary synchronization signal (SSS) is selected for use by a base station device of the radio access network.

In an example embodiment and mode a spacing of the first sequence and the second sequence within a frame may indicate the stratum level.

In an example embodiment and mode the processor circuitry may be further comprising determining whether to use the device-to-device synchronization signal as a timing signal for the wireless terminal.

In an example embodiment and mode the method may further comprise determining whether to use the device-to-device synchronization signal as a timing signal for the wireless terminal based on received signal quality of the device-to-device synchronization signal and the stratum level.

In an example embodiment and mode the method further may comprise generating a further device-to-device synchronization signal, the further device-to-device synchronization signal being configured to express: (1) the timing information; (2) device-to-device synchronization source information of the wireless terminal device; and (3) a stratum level of the wireless terminal; and transmitting the further device-to-device synchronization signal to a further wireless terminal device.

As used herein, the term "device-to-device ("D2D") communication" or "sidelink direct communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. Communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" and/or "wireless terminal device" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal A cellular network using licensed frequency bands can include configured cells. Configured cells can include cells of which a UE terminal is aware and in which it is allowed by a base station to transmit or receive information.

FIG. 1A shows an example communications system 20 wherein radio access node, which may be a base station node (also called a base station device 22), serves a cell 24 of a radio access network. FIG. 1A also shows first wireless terminal $26_1$, also known as a first UE. The technology disclosed herein covers both the case wherein wireless terminal $26_1$ may be within coverage of the radio access network that includes cell 24 (e.g., "within network coverage"), and the case in which wireless terminal $26_1$ is outside of coverage of the radio access network that includes cell 24 (e.g., "out[side] of network coverage"). FIG. 1A shows the within network coverage scenario; FIG. 1B shows the out of network coverage.

For the case that wireless terminal $26_1$ is within network coverage, the wireless terminal $26_1$ communicates over an air or radio interface with base station device 22 and may receive an in-coverage transmission timing reference ($TTR_1$) from base station device 22. In an example embodiment, the in-coverage transmission timing reference ($TTR_1$) may be the primary synchronization signal (PSS) and/or the secondary synchronization signal (SSS) transmitted by base station device 22. The wireless terminal $26_1$ may initiate and participate in device-to-device (D2D) communications with another or second wireless terminal $26_2$. In the case of FIG. 1A the wireless terminal $26_1$ detects the in-coverage transmission timing reference ($TTR_1$) received from base station device 22 and derives therefrom a first device-to-device (D2D) synchronization signal ($D2DSS_1$) that is included in a device-to-device (D2D) transmission from wireless terminal $26_1$ to wireless terminal $26_2$. For its own device-to-device (D2D) the wireless terminal $26_2$ must determine its timing reference, and to do so must choose from either the first device-to-device (D2D) synchronization signal ($D2DSS_1$) received from wireless terminal $26_1$ or any other synchronization signals other devices.

In an example embodiment the wireless terminal $26_2$ of FIG. 1A may serve as a relay for further transmitting the device-to-device (D2D) communications initiated by wireless terminal $26_2$ to third wireless terminal $26_3$. Alternatively, a device-to-device (D2D) communication may be initiated by wireless terminal $26_2$ toward wireless terminal $26_3$. Based on its choice of timing reference, the wireless terminal $26_2$ generates a second device-to-device (D2D) synchronization signal ($D2DSS_2$) that is included in a device-to-device (D2D) transmission from wireless terminal $26_2$ to wireless terminal $26_3$.

FIG. 1A thus shows three "hops" or "stratum levels" that may be involved in the receipt and generation of synchronization signals. As used herein, stratum level indicates a relative device position of the wireless terminal device in a consecutive chain of devices from a timing reference source. In the case of FIG. 1A, the chain of devices comprises base station device 22, wireless terminal $26_1$, wireless terminal $26_2$, and wireless terminal $26_3$. In FIG. 1A the timing reference source is base station device 22, and the timing reference may be the primary synchronization signal (PSS) and/or the secondary synchronization signal (SSS) transmitted by base station device 22. In such case, the wireless terminal $26_1$ is positioned at the first stratum level after a first hop from base station device 22 to wireless terminal $26_1$; the wireless terminal $26_2$ is positioned at the second stratum level after a second hop from wireless terminal $26_1$ to wireless terminal $26_2$; and the wireless terminal $26_3$ is positioned at the third stratum level. In some implementations the first hop may be numbered as hop 1, the second numbered as hop 2, the third hop number as hop 3, and so forth. In yet other implementations first hop may be numbered as hop 0, the second numbered as hop 1, the third hop number as hop 2, and so forth.

FIG. 1B shows the wireless terminal $26_1$ being out of network coverage. As such, wireless terminal $26_1$ does not receive a timing reference from base station device 22. Rather, wireless terminal $26_1$ generates its own timing reference ($D2DSS_1'$) which serves as the anchor timing reference, e.g., out-coverage transmission timing reference ($TTR_0$). The wireless terminal $26_1'$ thus becomes the timing reference source for a chain of devices shown in FIG. 1B. The chain of devices in FIG. 1B comprises wireless terminal $26_1'$, wireless terminal $26_2'$, and wireless terminal $26_3'$. In such case, the wireless terminal $26_2'$ is positioned at the first stratum level after a first hop from wireless terminal $26_1'$ to wireless terminal $26_2'$ and the wireless terminal $26_3'$ is positioned at the second stratum level after a second hop from wireless terminal $26_2'$ to wireless terminal $26_3'$.

As in the case of FIG. 1A, the wireless terminal $26_1'$ of FIG. 1B may initiate device-to-device (D2D) communications with another or second wireless terminal $26_2'$. In the case of FIG. 1B the wireless terminal $26_2'$ detects the out-coverage transmission timing reference ($TTR_1$), e.g., $D2DSS_1'$, received from wireless terminal $26_1'$. For its own device-to-device (D2D) the wireless terminal $26_2'$ must determine its timing reference, and to do so must choose from either the first device-to-device (D2D) synchronization signal ($D2DSS_1'$) received from wireless terminal $26_1'$ or any other synchronization signals other devices. In an example embodiment the wireless terminal $26_2'$ of FIG. 1B may serve as a relay for further transmitting the device-to-device (D2D) communications initiated by wireless terminal $26_2'$ to third wireless terminal $26_3'$. Alternatively, a device-to-device (D2D) communication may be initiated by wireless terminal $26_2'$ toward wireless terminal $26_3'$. Based on its choice of timing reference, the wireless terminal $26_2'$ generates a second device-to-device (D2D) synchronization signal ($D2DSS_2'$) that is included in a device-to-device (D2D) transmission from wireless terminal $26_2'$ to wireless terminal $26_3'$.

Figure 11:
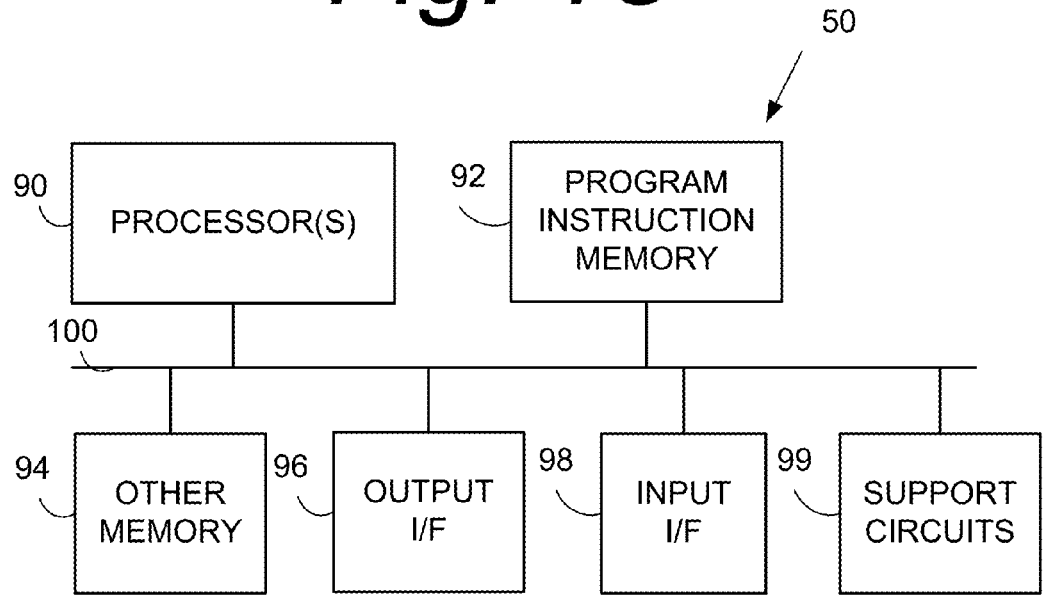
FIG. 11 is a schematic view illustrating an example embodiment of electronic circuitry that may comprise a device-to-device (D2D) wireless terminal.

FIG. 1A and FIG. 1B both show example constituent elements and/or functionalities of the various wireless terminals, collectively and generically referred to as wireless terminal device 26. Each wireless terminal 26 comprises radio interface circuitry 30 comprising radio receiver (RX) or circuitry 32 and radio transmitter (TX) circuitry 34. Each wireless terminal 26 further comprises device-to-device (D2D) controller 40, which in turn comprises device-to-device (D2D) synchronization signal (D2DSS) detector 42 and device-to-device (D2D) synchronization signal (D2DSS) generator 44. The device-to-device (D2D) controller 40, including D2DSS detector 42 and D2DSS generator 44 is preferably realized by electronic circuitry 50 which may include a computer processor, as shown in FIG. 11. It will also be appreciated that each wireless terminal 26 includes other unillustrated functionalities and units pertinent to the operation of wireless terminal 26, and that one or more of those unillustrated functionalities and units may also be realized by electronic circuitry 50.

For each wireless terminal $26_i$, the radio receiver circuitry $32_i$ is configured to receive a device-to-device synchronization signal from a transmitting device. The transmitting device may be the base station device 22 in the case of wireless terminal $26_1$ of FIG. 1A, or the transmitting device may be another wireless terminal device $26_{i-1}$ in the case of any other wireless terminal $26_i$.

The D2DSS detector 42, of wireless terminal 26, is configured to decode the device-to-device synchronization signal ($D2DSS_i$) received from the transmitting device, and to obtain therefrom the following: (1) timing information based on a transmission timing reference; (2) device-to-device synchronization source information (D2DSSII) of the transmitting device; and (3) a stratum level of the transmitting device.

The D2DSS generator 44, of wireless terminal 26, is configured to generate a device-to-device synchronization signal which is configured to express: (1) timing information based on a transmission timing reference; (2) device-to-device synchronization source information of the wireless terminal device $26_i$; and (3) a stratum level of the wireless terminal device $26_{i+1}$.

For each wireless terminal $26_i$, the radio transmitter circuitry $34_i$ is configured to transmit the device-to-device synchronization signal to a receiving wireless terminal, e.g., wireless terminal $26_{i+1}$.

As understood from the foregoing, the stratum level indicates relative device position of the transmitting device in a consecutive chain of devices from a timing reference source.

Figure 2A:
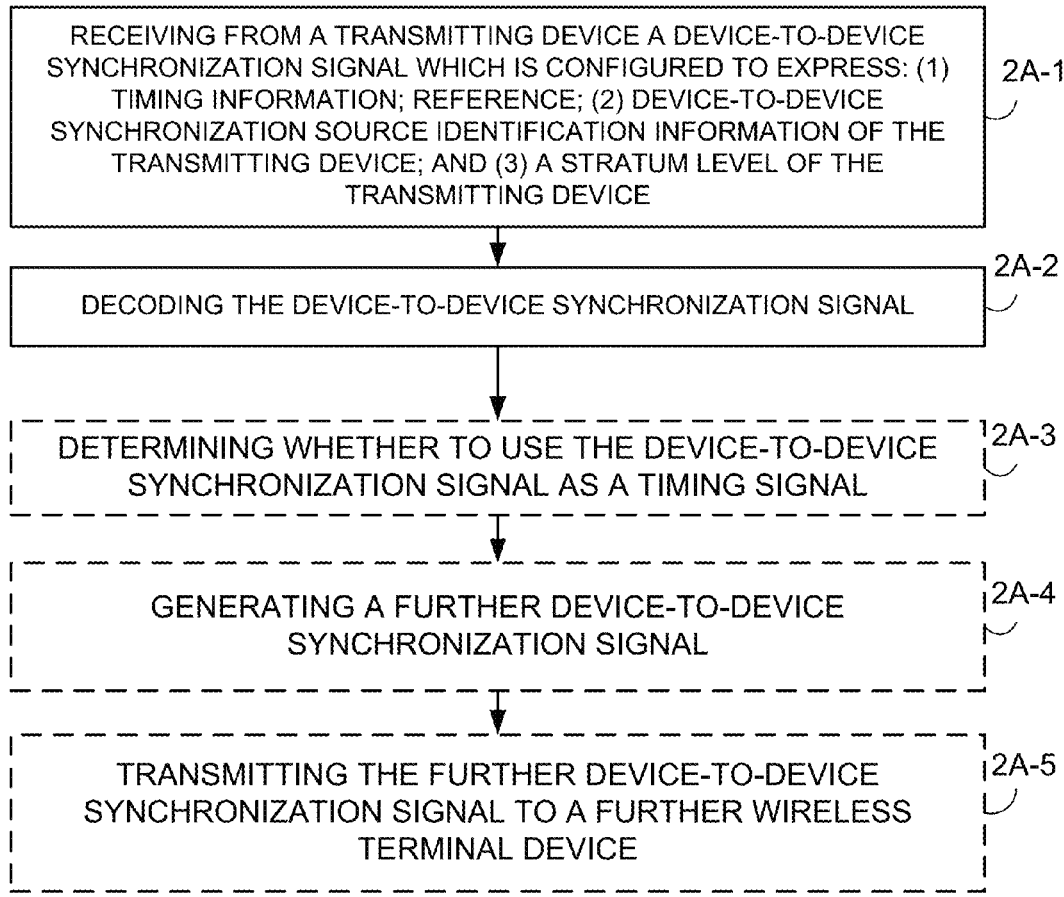
FIG. 2A is a flowchart depicting basic, example acts or steps involved in a generic method of operating a device-to-device (D2D) wireless terminal in a device (D2D) synchronization signal D2DSS receiving mode.

FIG. 2A depicts basic, example acts or steps involved in a generic method of operating a device-to-device (D2D) wireless terminal in a device (D2D) synchronization signal D2DSS receiving mode. Act 2A-1 comprises receiving from the transmitting device a device-to-device synchronization signal which is configured to express: (1) timing information based on a transmission timing reference; (2) device-to-device synchronization source information of the transmitting device; and (3) a stratum level of the transmitting wireless terminal device, the stratum level indicating relative device position of the transmitting device in a consecutive chain of devices from a timing reference source. Act 2A-2 may be performed by radio receiver circuitry 32. Act 2A-2 comprises decoding the device-to-device synchronization signal to obtain: (1) the timing information based on the transmission timing reference; (2) the device-to-device synchronization source information of the transmitting device; and (3) the stratum level of the transmitting device. Act 2A-2 may be performed by D2DSS detector 42.

Act 2A-3 through and including act 2A-5 are optional steps. Act 2A-3 comprises determining whether to use the device-to-device synchronization signal as a timing signal for the wireless terminal. In an example embodiment and mode such determination may be based on received signal quality of the device-to-device synchronization signal and the stratum level. Act 2A-4 comprises generating a further device-to-device synchronization signal. Act 2A-4 may be performed by D2DSS generator 44. The further device-to-device synchronization signal is configured to express: (1) the timing information; (2) device-to-device synchronization source information of the wireless terminal device; and (3) a stratum level of the wireless terminal. Act 2A-5 comprises transmitting the further device-to-device synchronization signal to a further wireless terminal device. Act 2A-5 may be performed by radio transmitter circuitry 34.

Figure 2B:
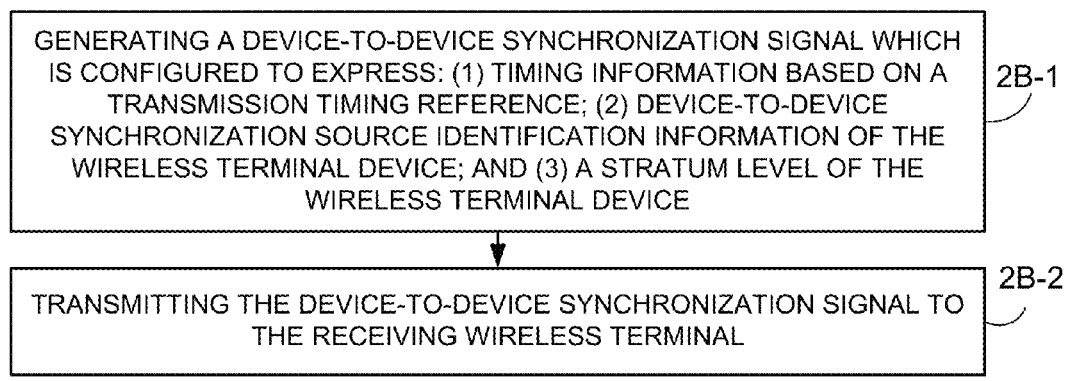
FIG. 2B is a flowchart depicting basic, example acts or steps involved in a generic method of operating a device-to-device (D2D) wireless terminal in a device-to-device (D2D) synchronization signal D2DSS transmitting mode.

FIG. 2B depicts basic, example acts or steps involved in a generic method of operating a device-to-device (D2D) wireless terminal in a device-to-device (D2D) synchronization signal D2DSS transmitting mode. Act 2B-1 comprises generating a device-to-device synchronization signal which is configured to express: (1) timing information based on a transmission timing reference; (2) device-to-device synchronization source information of the wireless terminal device; and (3) a stratum level of the wireless terminal device. Act 2B-1 may be performed by D2DSS generator 44. Act 2B-2 comprises transmitting the device-to-device synchronization signal to the receiving wireless terminal. Act 2B-2 may be performed by radio transmitter circuitry 34.

Figure 3A:
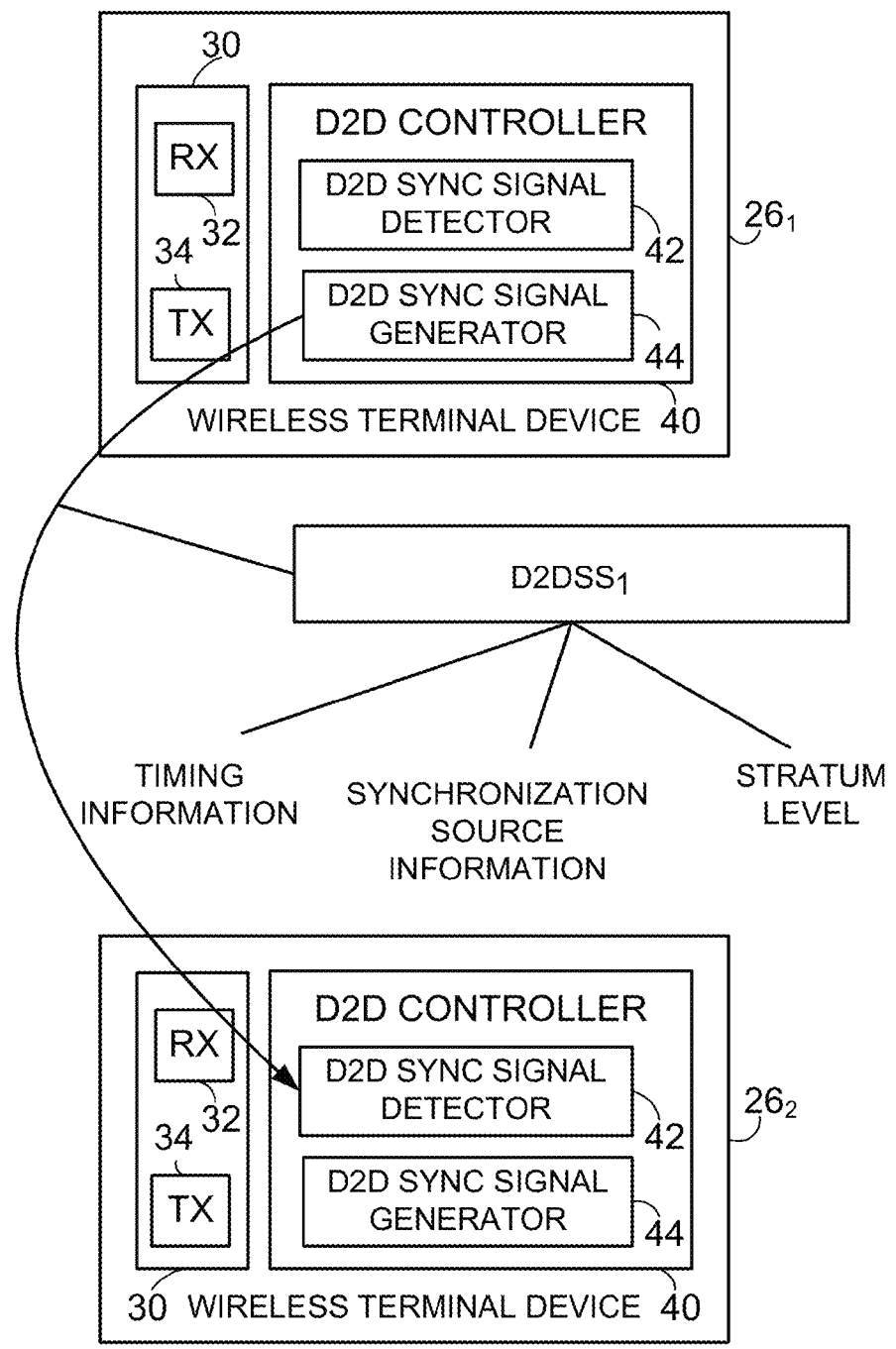
FIG. 3A is a diagrammatic view depicting an example, representative device-to-device (D2D) synchronization signal which is configured to express plural types of information transmitted between two devices.

Thus, the device-to-device synchronization signal of the technology disclosed herein is configured to express: (1) timing information based on a transmission timing reference; (2) device-to-device synchronization source information; and (3) stratum level. FIG. 3A shows, in the context of the example case of FIG. 1A but in representative fashion for other cases as well, an example, representative device-to-device (D2D) synchronization signal $D2DSS_1$ which is transmitted from wireless terminal $26_1$ to wireless terminal $26_2$. FIG. 3A shows the device-to-device (D2D) synchronization signal D2DSS as expressing all three types of information. However, the device-to-device (D2D) synchronization signal D2DSS does not contain separately identifiable fields for the respective three types of information, but rather by its overall content and/or manifestation (e.g., repetitive nature) in the time domain expresses all three types of information.

Figure 3B:
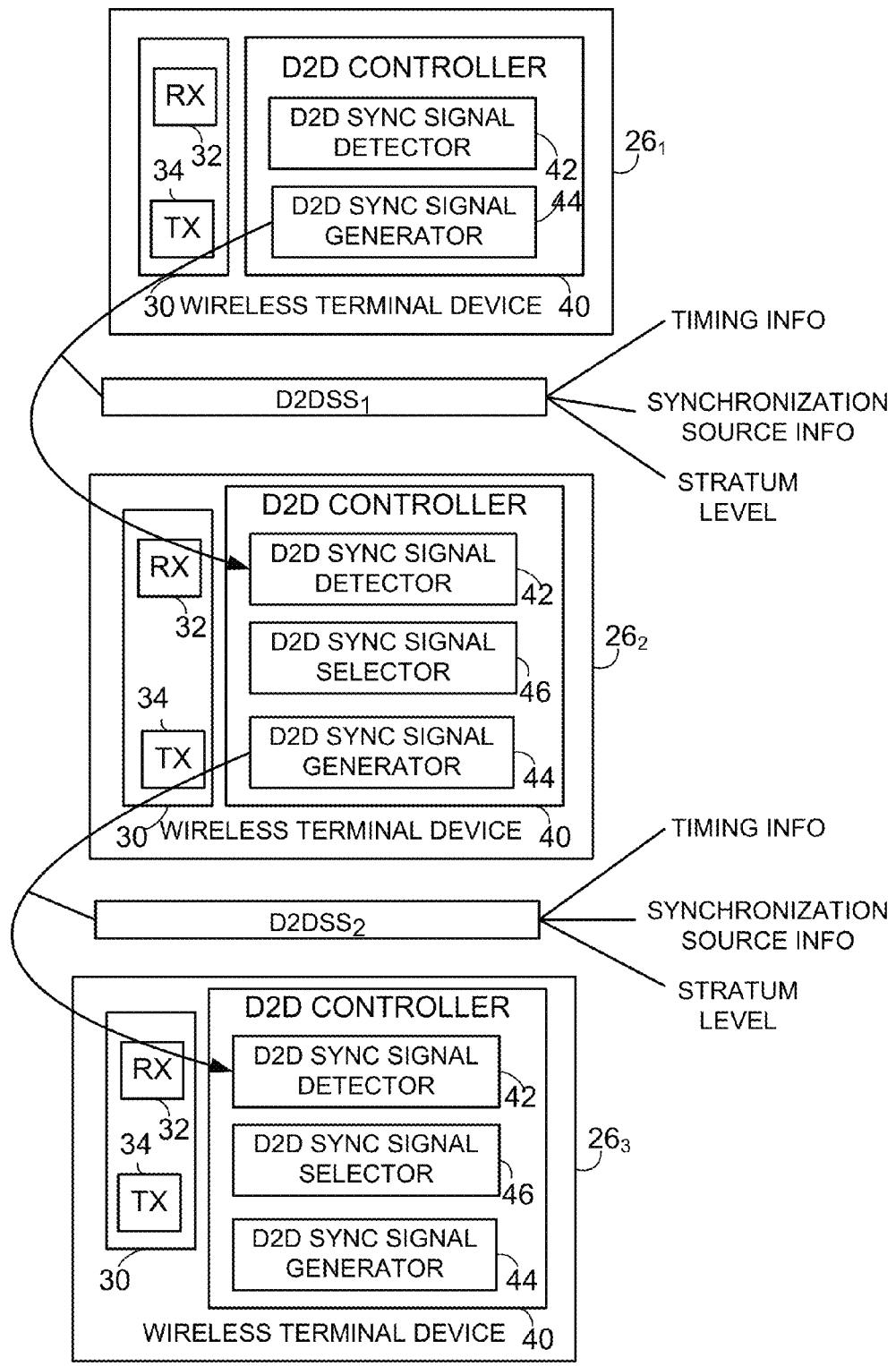
FIG. 3B is a diagrammatic view depicting example, representative device-to-device (D2D) synchronization signals, configured to express plural types of information, involving three devices.

FIG. 3B shows, also in the context of the example case of FIG. 1A but in representative fashion for other cases as well, representative device-to-device (D2D) synchronization signal $D2DSS_1$ which is transmitted from wireless terminal $26_1$ to wireless terminal $26_2$ along with representative device-to-device (D2D) synchronization signal $D2DSS_2$ which is transmitted from wireless terminal $26_2$ to wireless terminal $26_3$. In this regard, FIG. 3B also illustrates that any of the wireless terminals 26 described herein may further comprise D2D synchronization signal selector 46 (although only first wireless terminal $26_2$ and first wireless terminal $26_3$ but not first wireless terminal $26_1$ are so illustrated in FIG. 3B). The D2D synchronization signal selector 46 is configured to determine whether to use the device-to-device synchronization signal (e.g., $D2DSS_1$, or any other received device-to-device (D2D) synchronization signal) as a timing signal for the wireless terminal. As mentioned above, in an example embodiment and mode such determination may be based on received signal quality of the device-to-device synchronization signal and the stratum level. FIG. 3B also shows that (as aforementioned act 2A-4) the D2DSS generator 44 of wireless terminal $26_2$ generates a further device-to-device synchronization signal, e.g., $D2DSS_2$. The further device-to-device synchronization signal $D2DSS_2$ is also configured to express the three types of information: (1) the timing information; (2) device-to-device synchronization source information of the wireless terminal device $26_2$; and (3) a stratum level of the wireless terminal $26_2$. As act 2B-5 the transmitter 34 of second wireless terminal $26_2$ transmits the further device-to-device synchronization signal $D2DSS_2$ to a further wireless terminal device, e.g., wireless terminal $26_3$.

FIG. 3A and FIG. 3B both show the device-to-device (D2D) synchronization signal D2DSS as expressing all three types of information. However, in an example implementation the device-to-device (D2D) synchronization signal D2DSS does not contain separately identifiable fields for the respective three types of information, but rather by its overall content and/or manifestation (e.g., repetitive nature) in the time domain expresses all three types of information.

In the above regard, in an example embodiment and mode the device-to-device (D2D) synchronization signal D2DSS comprises one or more sequences. For example, in some example embodiments and modes the device-to-device (D2D) synchronization signal D2DSS may comprise a sequence selected from a set of plural sequences. In such example embodiments and modes, the sequence is selected to express all three types of information: (1) timing information based on a transmission timing reference; (2) device-to-device synchronization source information; and (3) stratum level. In other example embodiments and modes, the device-to-device (D2D) synchronization signal D2DSS comprises a first sequence and a second sequence selected respectively from a first set of plural sequences and a second set of plural sequences selected from a set of plural sequences. In such example embodiments and modes, the combination (e.g., concatenation) of the first sequence and the second sequence expresses all three types of information: (1) timing information based on a transmission timing reference; (2) device-to-device synchronization source information; and (3) stratum level.

Figure 4A:
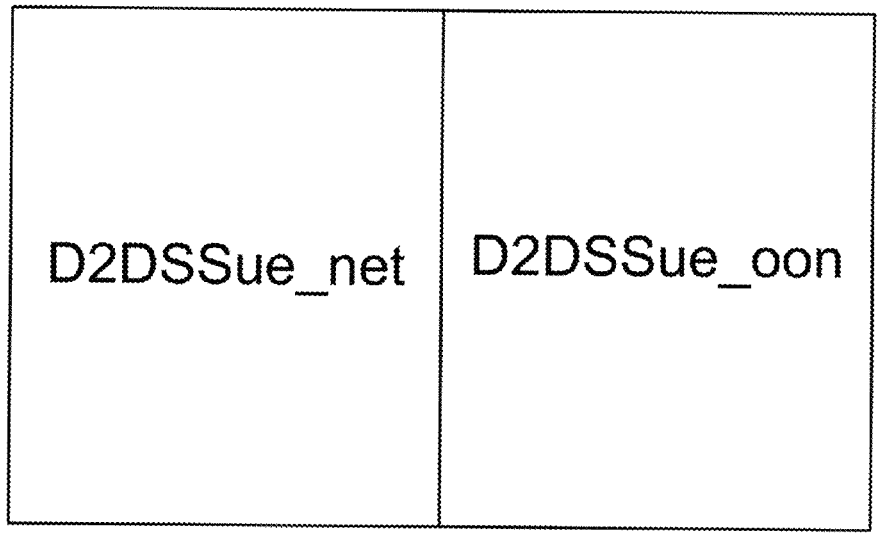
FIG. 4A-4C are diagrammatic views depicting differing example modes of subdividing set(s) of sequences from which the device-to-device (D2D) synchronization signal D2DSS is selected or constructed according to different categorization criteria.
Figure 4B:
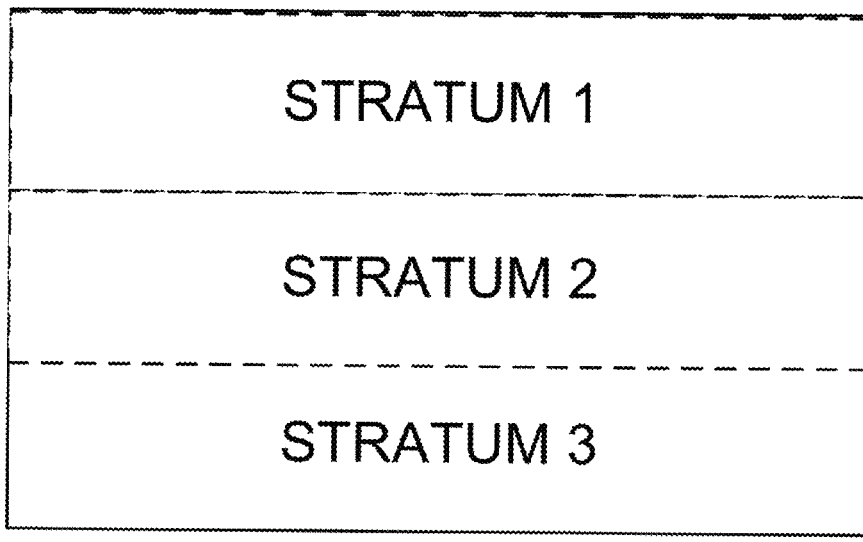
Figure 4C:
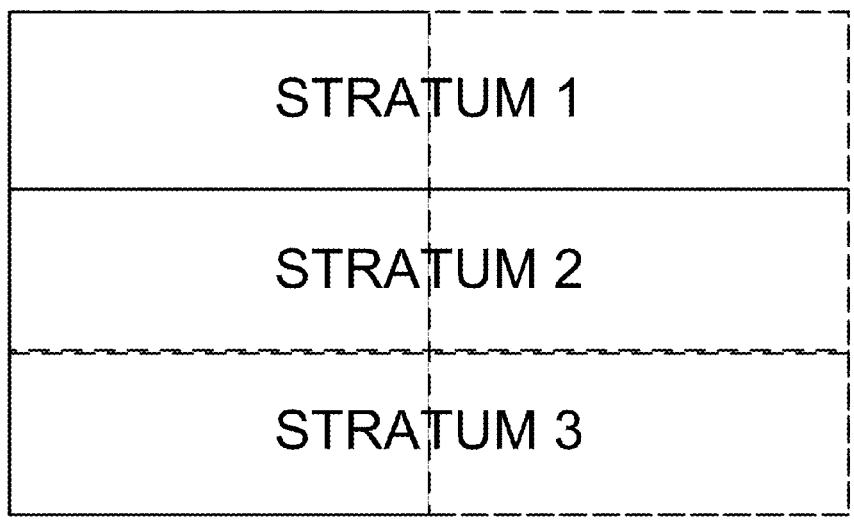

The set(s) of sequences from which the device-to-device (D2D) synchronization signal D2DSS is selected or constructed may be divided or categorized into one or more groups according to different categorization criteria, as illustrated in FIG. 4A-FIG. 4C.

FIG. 4A illustrates that the set(s) of sequences may be subdivided based on whether the timing reference is originally from a base station device of the radio access network. FIG. 4A illustrates both a subset of sequences (D2DSSue_net) which may be selected or used for construction of the device-to-device (D2D) synchronization signal D2DSS when the timing reference is originally from a base station device (e.g., as occurs with reference to base station device 22 in FIG. 1A), as well as a subset of sequences (D2DSSue_oon) which may be selected or used for construction of the device-to-device (D2D) synchronization signal D2DSS when the timing reference is not originally from a base station device (e.g., as occurs in FIG. 1B).

FIG. 4B illustrates that the set(s) of sequences may be subdivided based on stratum level associated with the sequence. For example, one subdivision of the set(s) of sequences may be used when the device-to-device (D2D) synchronization signal D2DSS needs to express a first stratum level, a second subdivision of the set(s) of sequences may be used when the device-to-device (D2D) synchronization signal D2DSS needs to express a second stratum level, and so on.

FIG. 4C illustrates that the set(s) of sequences may be subdivided based on (1) whether the timing reference is originally from a base station device of the radio access network, and (2) whether the timing reference is originally from a base station device of the radio access network.

In general operation, device-to-device (D2D) devices communicate with each other across a radio interface using "frames" of information that are typically formatted and prepared by a scheduler of the transmitting device. In Long Term Evolution (LTE) a frame, which may have both downlink portion(s) and uplink portion(s). Each LTE frame may have a duration of 10 milliseconds, and comprise plural subframes. In the time domain, each LTE subframe is divided into two slots. The transmitted signal in each slot is described by a resource grid comprised of resource elements (RE).

Figure 5:
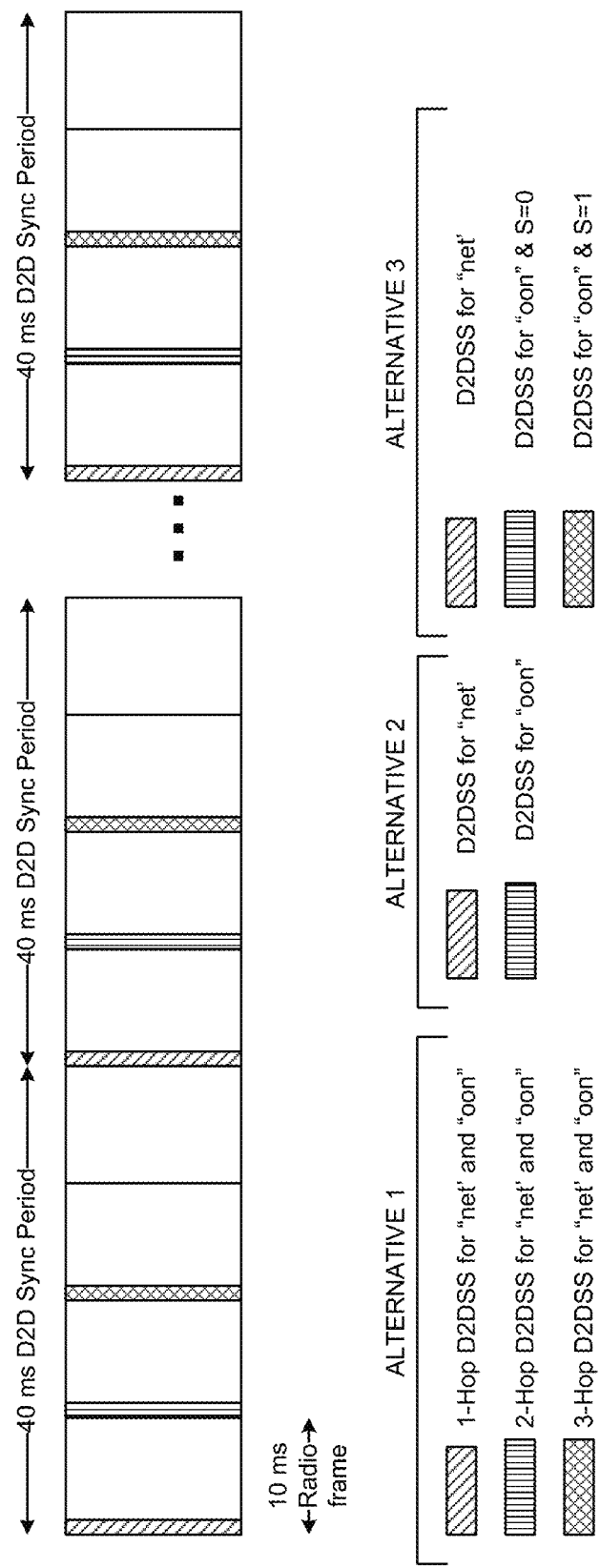
FIG. 5 is a diagrammatic view depicting differing an example device-to-device (D2D) synchronization signal D2DSS period.

A D2D synchronization source may transmit device-to-device (D2D) synchronization signal D2DSS in a predetermined period. In some example embodiments and modes, the D2DSS period is 40 ms, e.g., four radio frames, as shown in FIG. 5. D2DSS periods of other duration may be utilized, although period length considerations described herein should preferably be observed for sake of compatibility with and reuse of legacy LTE equipment. FIG. 5 also illustrates three alternative examples of how synchronization signals may be utilized in selected frames of the period.

Figure 6:
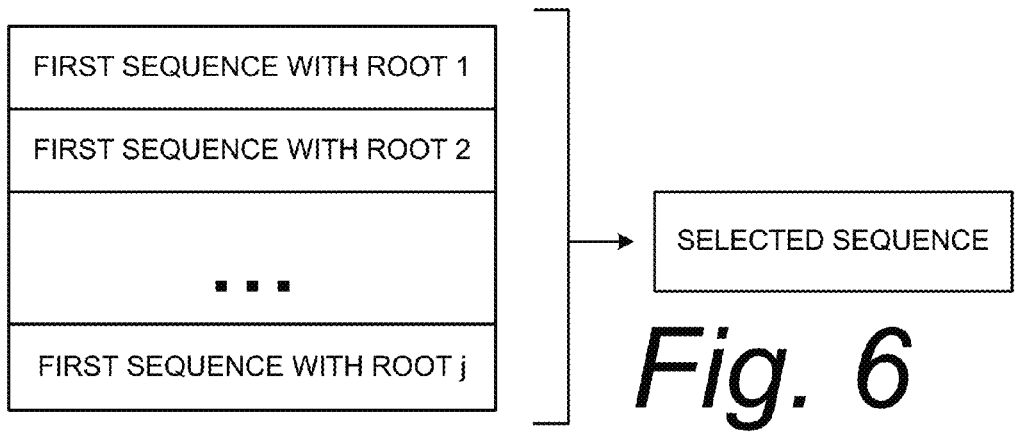
FIG. 6 is a diagrammatic view depicting a device-to-device (D2D) synchronization signal D2DSS comprising a sequence selected from a set of sequences having different roots.

As illustrated in FIG. 6 and explained further herein, for some example embodiments and modes the plural sequences of the set(s) of sequences from which the device-to-device (D2D) synchronization signal D2DSS is selected or constructed may each have a different root. FIG. 6 shows that the selected sequence is selected based on what the root represents. As also further explained herein, in some example implementations the set of plural sequences comprise a set of sequences from which a primary synchronization signal (PSS) is selected for use by a base station device of the radio access network.

In other example embodiments and modes illustrated by FIG. 7A-FIG. 7C, the device-to-device synchronization signal comprises a first sequence and a second sequence selected respectively from a first set of plural sequences and a second set of plural sequences selected from a set of plural sequences. The first sequence may be referred to as a primary D2D synchronization signal (PD2DSS) and the second sequence may be referred to as a secondary D2D synchronization signal (SD2DSS).

In example implementations represented by FIG. 7A the first sequence is selected to indicate the stratum level. In some example, non-limiting implementations each of the plural sequences of the first set from which the first sequence is selected may have a different root. For example, the first set of plural sequences may comprise a set of sequences from which a primary synchronization signal (PSS) is selected for use by a base station device of the radio access network). Moreover for the FIG. 7B situation the second set of plural sequences may comprise a set of sequences from which a secondary synchronization signal (SSS) is selected for use by a base station device of the radio access network.

In example implementations represented by FIG. 7B the second sequence may be selected from a second set of sequences in a manner to indicate the stratum level. For example, as shown in FIG. 7C, the second set of plural sequences may be partitioned into plural ranges, with each of the plural ranges indicating a different stratum level. In an example implementation, the second set of plural sequences may comprise a set of sequences from which a secondary synchronization signal (SSS) is selected for use by a base station device of the radio access network.

It has been explained above that the device-to-device synchronization signal of the technology disclosed herein is configured to express: (1) timing information based on a transmission timing reference; (2) device-to-device synchronization source information; and (3) stratum level. As used herein, "device-to-device synchronization source information" may include one or more of device-to-device synchronization source identification information and device-to-device synchronization source type information. There are several possible ways to define device-to-device synchronization source information, e.g., D2D synchronization source identifiers. A first definition occurs (is used to distinguish multiple candidates) when there is an eNB source and non-eNB source (2 IDs are needed). A second definition occurs when there is an eNB source, an in-coverage source, and an out-of-coverage source (3 IDs or 2 IDs with hopping number are needed). A third definition occurs when there is an eNB source and all other sources (independent synchronization cluster heads) with their associated IDs (more than 100 IDs may be needed). A fourth definition occurs when there is an eNB source, all other sources transmitting D2DSS (independent synchronization cluster heads and UEs deriving timing from eNB or independent sources) with their associated IDs (double or triple of IDs for the third definition). Thus there are only two or three synchronization source IDs required for first and second definitions, respectively. In that case, SD2DSS does not necessarily carry synchronization source information; PD2DSS can be enough (see, e.g., Alternative 1.2 described below [which uses time domain spacing between two PD2DSS if PD2DSS repeating is allowed for better detection energy accumulation] and Alternatives 1.3 and 2). However, definitions 3 and 4 above reuse the method of legacy LTE SS, which must use SD2DSS to carry synchronization source information, as hundreds of independent SCHs may exist for out of coverage case and all of them require IDs.

It should be mentioned that the primary D2D synchronization signal (PD2DSS) and the secondary D2D synchronization signal (SD2DSS) are two signals, instead of two physical channels. They may be in the relatively fixed position in a frame (their positions can either be known or can be derived). For example, PD2DSS may be in the 7th symbol of a first subframe of a LTE frame, and the associated SD2DSS may be in the 6th symbol of that subframe. Therefore, when a PD2DSS is detected by a D2DSS detector 42, the D2DSS detector 42 may go to the previous one symbol to achieve obtain the SD2DSS. Furthermore, different D2DSS sequences are mapped to the LTE frame structure via TDM; a synchronization period can consist of multiple frames, so different D2DSS will be mapped to different frames, just go to different frame to retrieve information of PD2DSS and associated SD2DSS.

Figure 8A:
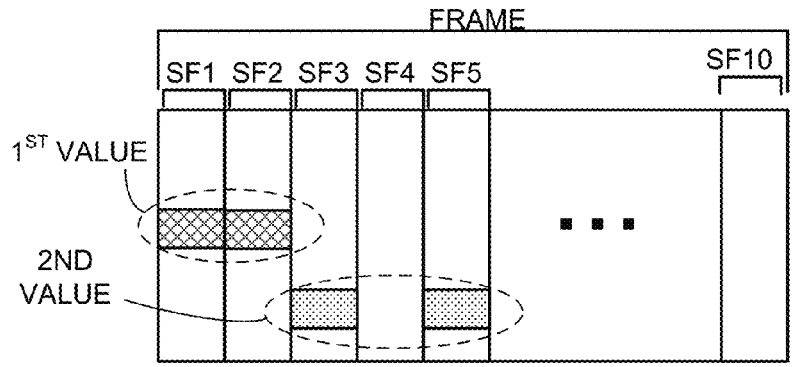
FIG. 8A and FIG. 8B are diagrammatic views depicting various manners of spacing of sequences within a frame to indicate information expressed by a device-to-device (D2D) synchronization signal D2DSS.
Figure 8B:
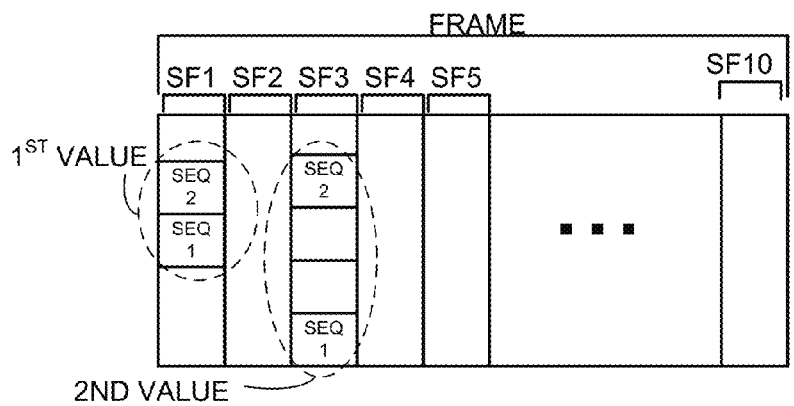

In other example embodiments and modes represented by FIG. 8A and FIG. 8B, spacing of sequences within a frame (e.g., spacing within the time domain) may indicate the information expressed by the device-to-device (D2D) synchronization signal D2DSS, such as the stratum level.

For example, with reference to FIG. 8A, when only one sequence is utilized, the interval at which the sequence is repeated in the frame may indicate an expressed value. For example, if the sequence is repeated in two consecutive subframes (SFs) as shown by the symbols with criss-cross hatching (in the first and second subframes of FIG. 8A), a first value may be indicated. On the other hand, if the sequence is repeated in a third and fifth subframes as shown by the symbols with stippled hatching (e.g., two subframes separated by a subframe), a second value may be indicated. Other repetition patterns may alternatively be used, the foregoing having been illustrated only for representative example.

FIG. 8B shows a situation in which two sequence are utilized for the device-to-device (D2D) synchronization signal D2DSS. FIG. 8B illustrates that a spacing of the first sequence and the second sequence within a frame may indicate information expressed by the device-to-device (D2D) synchronization signal D2DSS, e.g., the stratum level. For example, in the first subframe the fact that the first sequence and the second sequence are in adjacent symbols indicates a first value. On the other hand, if the first sequence and the second sequence are separated by a predetermined number of symbols, a second value may be indicated. For example, FIG. 8B depicts a second value by the two sequences appearing in the third subframe being separated by two symbols. Other separation amounts in other subframes, or combination of subframes, may alternatively be used, to represent various other values.

Embodiments and modes including but not limited to those summarized above are now described in more detail and/or with illustrative and non-limiting examples. In many instances the terminology "UE" (which stands for user equipment) may be used interchangeably with wireless terminal. Similarly, "eNB" or "eNodeB" or the like may be used interchangeably with base station or base station device.

As explained above, a D2D synchronization source may transmit the device-to-device (D2D) synchronization signal D2DSS in each period, e.g., 40 ms. As shown in FIG. 5, The D2DSS may comprise two sequences, e.g. a primary D2D synchronization sequence (PD2DSS) and a secondary D2D synchronization sequence (SD2DSS). If the maximum allowed stratum level is three, PD2DSS sequences may be selected from the set of LTE downlink PSS sequences, which are 62 length Zadoff-Chu (ZC) sequence mapped centrally symmetric around D.C. frequency. If SD2DSS is included, SD2DSS sequences may be selected from the set of LTE downlink SSS sequences, which are M-sequences. If maximally more than three hops are allowed, other ZC sequences (Other ZC root sequence indices other than PSS root indices (u=25, 29 and 34) used by LTE downlink PSS) with good periodic autocorrelation and cross-correlation properties and associated M-sequences may be introduced.

Alternative Definitions

In example embodiments and modes the set of D2DSS sequences that can be transmitted by a wireless terminal 26 (UE) may be divided into two groups and their associated information to further describe them. Described herein are several alternative definitions which may depending on such factors as (1) whether sequences in D2DSSue_net can be relayed between two UEs; and (2) when the UE receives PSS/SSS and transmits D2DSS in D2DSSue_net, whether the UE is regarded as the original synchronization source of this D2DSSue_net timing, or whether the eNB is regarded as the original synchronization source of this D2DSSue_net timing.

In Alternative A, D2DSSue_net is or comprises a set of D2DSS sequence(s) transmitted by the UE when the transmission timing reference is PSS/SSS. In other words, transmission timing of D2DSSue_net is derived directly from PSS/SSS received by the UE (i.e. D2D Synchronization Source is eNB). Moreover, D2DSSue_oon is or comprises a set of D2DSS sequence(s) transmitted by the UE when the transmission timing reference is not an eNB. Multi-hop may be supported (in which case transmission timing of D2DSSue_oon is not derived directly from legacy eNB PSS/SSS. Transmission timing of D2DSSue_oon may be derived directly from D2DSSue_oon or D2DSSue_net; no matter that original timing source is PSS/SSS or not (i.e. D2D Synchronization Source is eNB or UE)).

Figure 9A:
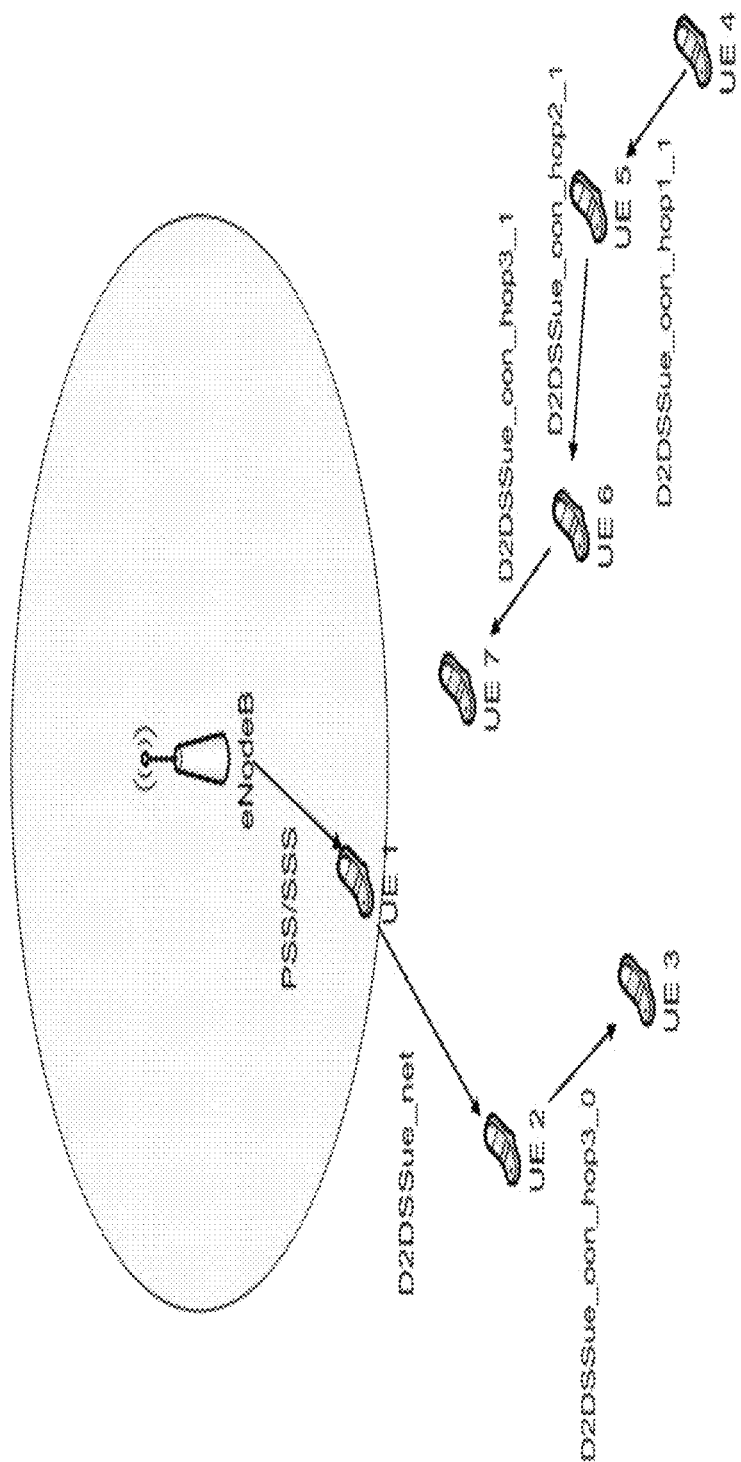
FIG. 9A is a diagrammatic view depicting a first device-to-device (D2D) synchronization signal D2DSS sequence definition alternative.
Figure 9B:
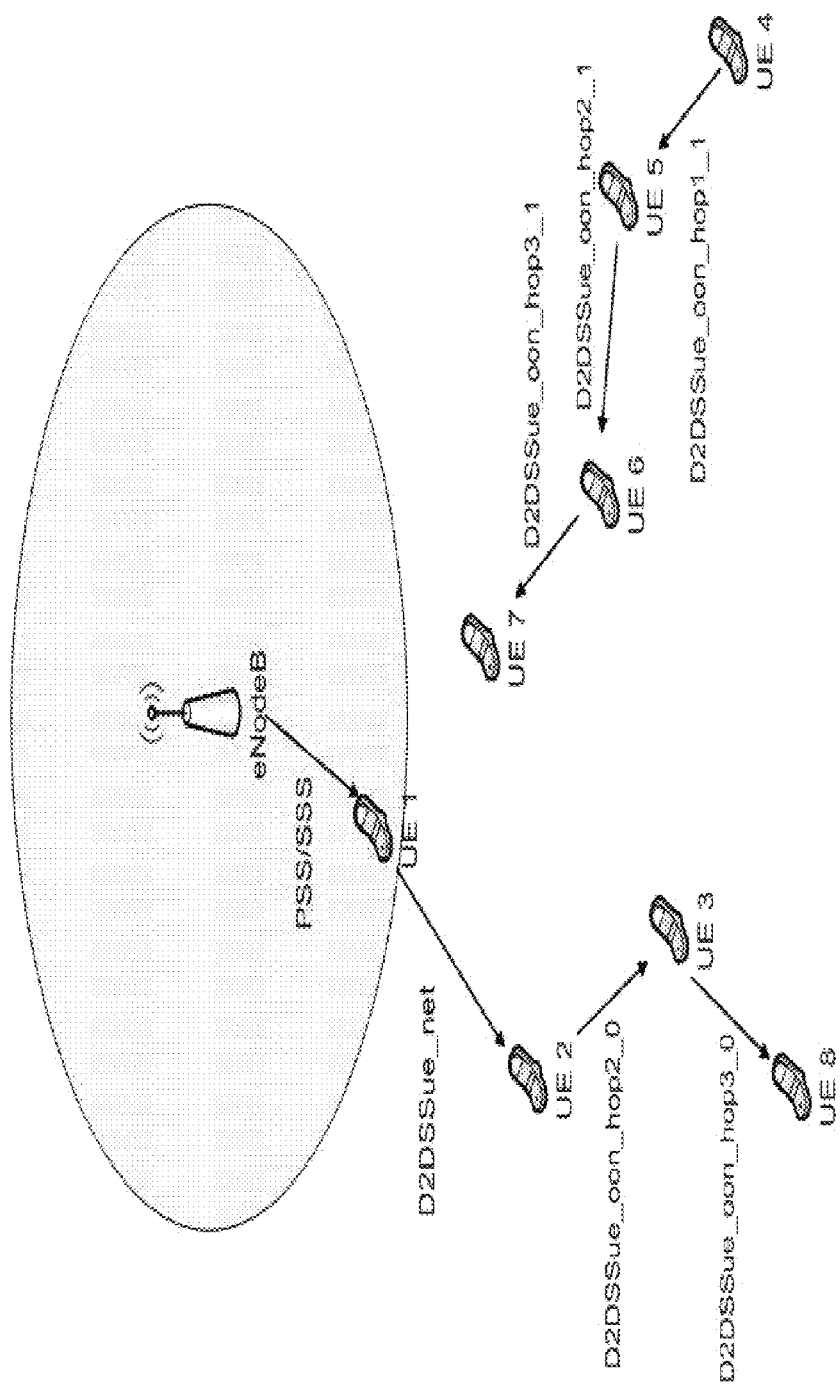
FIG. 9B is a diagrammatic view depicting a variation of the definition alternative of FIG. 9A.

Alternative A is illustrated, for example, in FIG. 9A. In FIG. 9A, D2DSSue_oon_hop1_1 means the D2DSS that the UE (e.g., UE4) sends to UE5 is derived from the synchronization signal D2DSSue_oon that was originated but not received by UE4). D2DSSue_oon_hop_1 means the D2DSS that the UE (e.g., UE5) sends to UE6 is derived by UE5 from the synchronization signal D2DSSue_oon_hop1_1 that was received by UE5. D2DSSue_oon_hop3_1 means the D2D SS that the UE (e.g., UE6) sends to UE7 was derived by UE6 from the synchronization signal D2DSSue_oon_hop_1 that was received by UE6. D2DSSue_oon_hop3_0 means the D2DSS that the UE (e.g., UE 2) sends to UE3 was derived from the synchronization signal D2DSSue_net received from UE1. (Note: it means the UE2 receives D2DSS in D2DSSue_net and selects this eNB timing as its timing, and transmits this timing by D2DSS in D2DSSue_oon_hop3_0). In this structure, only hop3 need to be classified based on original timing source.

Alternative A', illustrated in FIG. 9A, is essentially the same as FIG. 9A Alternative A except for the fact that in Alternative A' the stratum level value X can be 0 to 3 and PSS/SSS is considered as hop0.

Figure 10A:
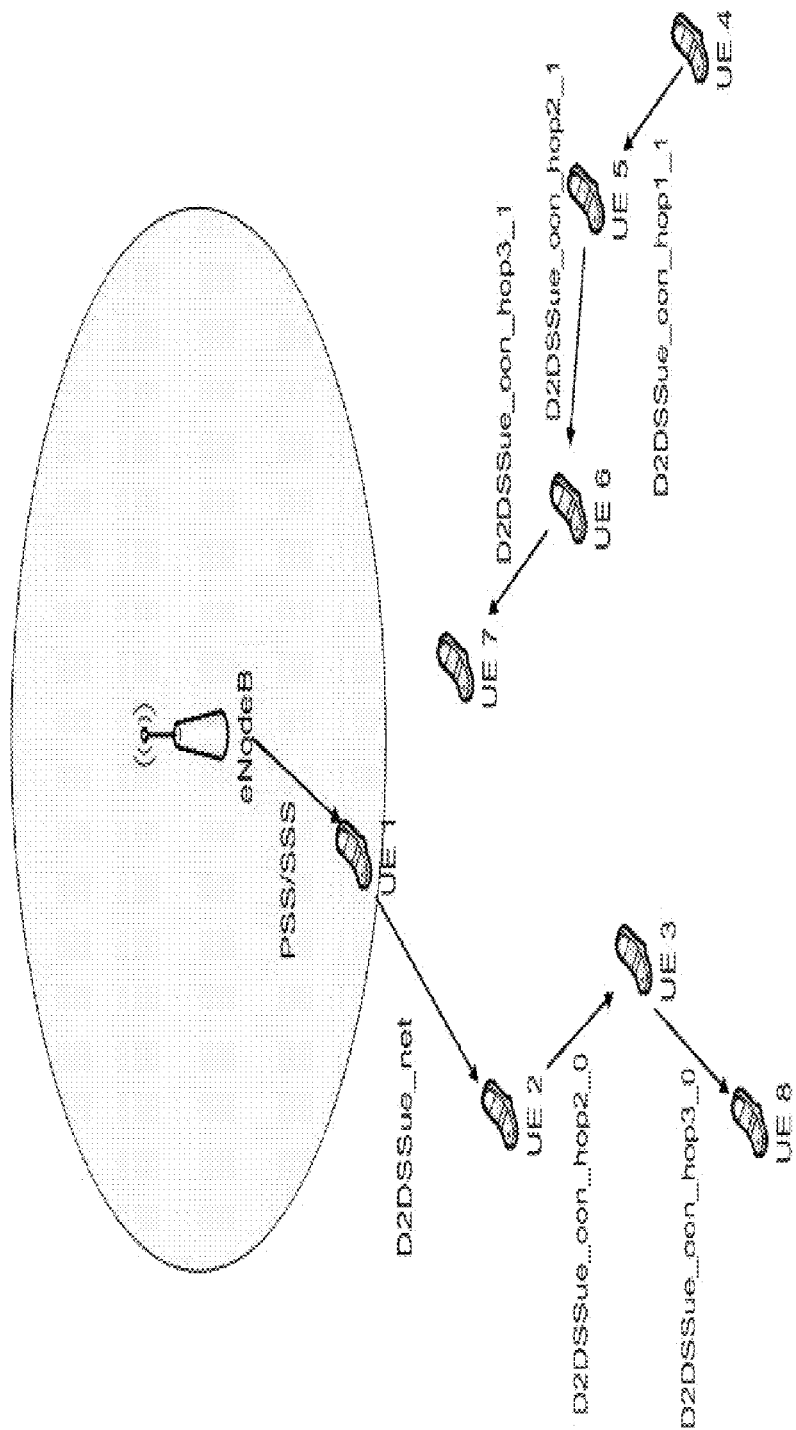
FIG. 10A is a diagrammatic view depicting a second device-to-device (D2D) synchronization signal D2DSS sequence definition alternative.

Alternative B is illustrated in FIG. 10A. In Alternative B D2DSSue_net is or comprises a set of D2DSS sequence(s) transmitted by the UE when the transmission timing reference is PSS/SSS. Multi-hop may be supported (e.g., transmission timing of D2DSSue_net is originally from PSS/SSS) (i.e. D2D Synchronization Source is eNB)). Transmission timing of D2DSSue_net is based on either PSS/SSS received by the UE or D2DSSue_net received by the UE.

In Alternative B, D2DSSue_net_hopX is a definition of type of D2DSSue_net. X can be 1 to 3. X is defined based on hopping count, where PSS/SSS is considered as hop1. For example, in FIG. 10A D2DSSue_net_hop2 means the D2DSS that UE1 derives based on received PSS/SSS. D2DSSue_net_hop3 means the D2DSS that UE2 derives based on received D2DSSue_net_hop2.

In Alternative B, D2DSSue_oon is or comprises a set of D2DSS sequence(s) transmitted by the UE when the transmission timing reference is not an eNB. Multi-hop may be supported (e.g., transmission timing of D2DSSue_oon is not originally from PSS/SSS (i.e. D2D Synchronization Source is UE)). Transmission timing of D2DSSue_oon is derived based on D2DSSue_oon received by the UE or UE just decides the transmission timing without referring D2DSS. In Alternative B, D2DSSue_oon_hopX is a definition of type of D2DSSue_oon. X can be 1 to 3. X is defined based on hopping count, where D2DSSue_oon transmission by the D2D Synchronization Source is considered as hop1. For example in FIG. 10A, D2DSSue_oon_hop1 means the D2DSS that UE4 derives based on its own timing. D2DSSue_oon_hop2 means the D2DSS that UE5 derives is based on received D2DSSue_net_hop1.

Figure 10B:
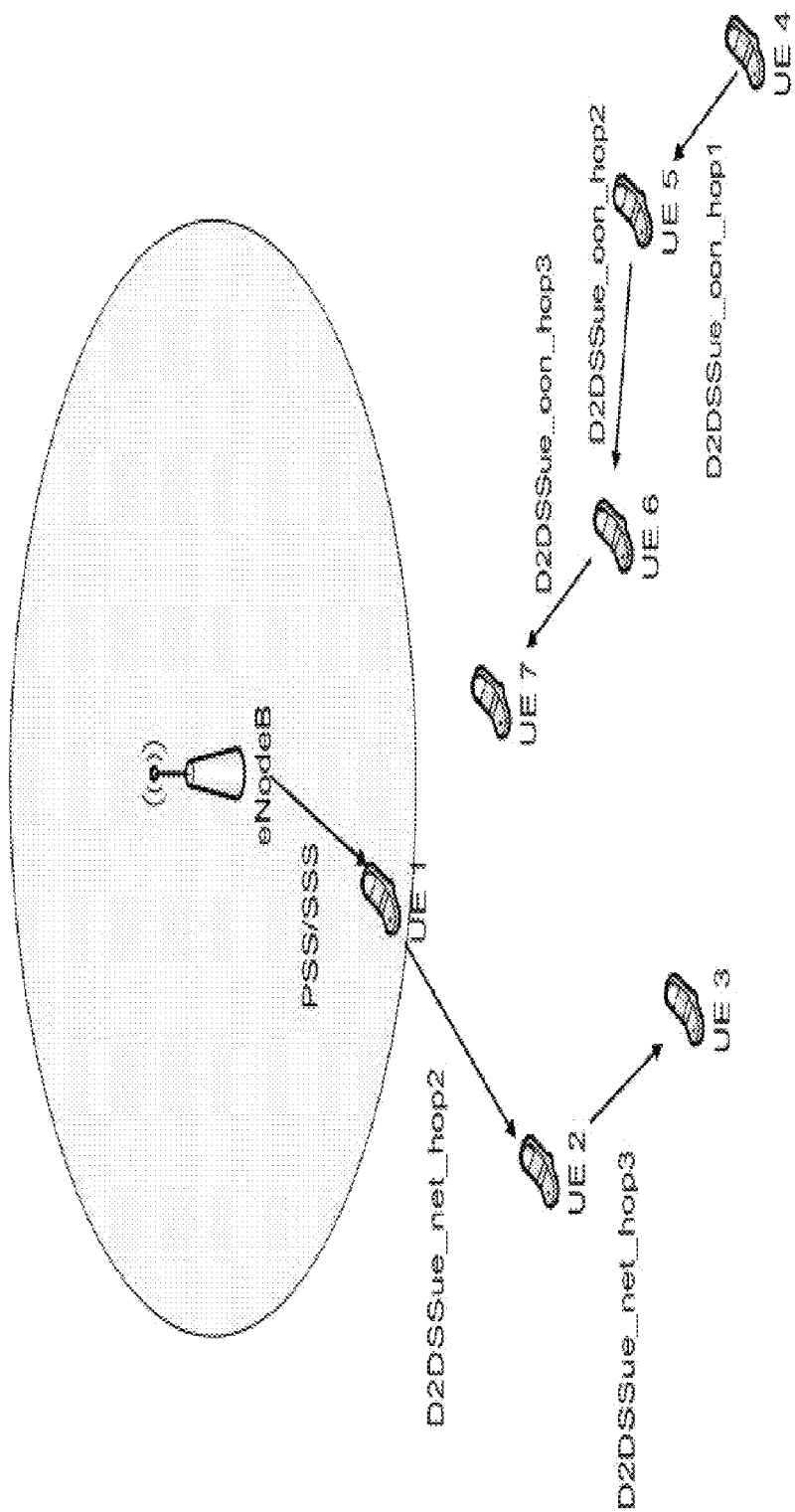
FIG. 10B is a diagrammatic view depicting a variation of the definition alternative of FIG. 10A.

Alternative B', illustrated in FIG. 10B, resembles Alternative B of FIG. 10B except that in Alternative B' of FIG. 10B X can be 0 to 3 and PSS/SSS is considered as hop0.

D2D Sequence Grouping Alternative

As mentioned above, the technology disclosed herein encompasses various D2D sequence grouping alternatives. Some of these alternatives are illustrated with reference to FIG. 4A-4C discussed briefly above.

Sequence Grouping Alternative W: Two sets of D2DSS sequence groups are defined. One is D2DSSue_net and the other is D2DSSue_oon. See FIG. 4A.

Sequence Grouping Alternative X: Two sets of D2DSS sequence groups are defined. One is D2DSSue_net and the other is D2DSSue_oon. Each sets of D2DSS_sequence are divided into sub-groups based on stratum level X. See FIG. 4C.

Sequence Grouping Alternative Y: Two sets of D2DSS sequence groups are defined. One is D2DSSue_net and the other is D2DSSue_oon. Each set of D2DSS_sequence is divided into sub-groups based on synchronization source S. Synchronization source represents the timing, so that the D2DSS from the same source has the same timing. As explained before, synchronization source information may mean synchronization source ID or synchronization source type. According to Alternative 1, if the synchronization source information is synchronization source ID, Sequence Grouping Alternative Y resembles FIG. 4A. In accordance with Alternative 2, on the other hand, if synchronization source information is synchronization source type, then D2DSSue_oon can further be divided into many small sub-groups, each sub-group representing one out of coverage synchronization cluster head UE.

Sequence Grouping Alternative Z: Two sets of D2DSS sequence groups are defined. One is D2DSSue_net and the other is D2DSSue_oon. Each sets of D2DSS sequence are divided into sub-groups based on X and S, understood in the manner represented in FIG. 4C.

Mapping of D2DSS to Existing LTE Sequences

In some example embodiments and modes the D2DSS sequence groups defined above may be mapped to the existing LTE downlink synchronization signal sequences. Discussed below are Mapping Alternative 0 (with its sub-Alternatives 0-1 and 0-2); Mapping Alternative 1 (with its sub-Alternatives 1.1, 1.2, and 1.3); and Mapping Alternative 2.

Mapping Alternative 0: The D2DSS ID is chosen based on set. D2DSS ID represents a set of sequences. For example as similar to PSS and SSS, a physical-layer D2D identity $N_{ID}^{D2D}=3N_{ID}^{(1)}+N_{ID}^{(2)}$ is thus uniquely defined by a number $N_{ID}^{(1)}$ in the range of 0 to 167, representing the physical-layer D2D-identity group, and a number $N_{ID}^{(2)}$ in the range of 0 to 2, representing the physical-layer identity within the physical-layer D2D-identity group. Based on a physical-layer D2D identity, either or both of PD2DSS sequence and SD2DSS sequence is generated. Root indices for the PD2DSS is mapped as shown in Table 1.

Indices for the SD2DSS are defined based on physical-layer D2D-identity group $N_{ID}^{(1)}$.

Mapping Alternative 0-1: $N_{ID}^{(2)}$ may be selected based on whether the source is D2DSSue_net (e.g. 0) or D2DSSue_oon (e.g., 1) so that PD2DSS sequence indicates the source (e.g. eNB or UE). In other words, when hopping, the UE may select the same $N_{ID}^{(2)}$ as the one which is used in the received PD2DSS. $N_{ID}^{(2)}$ may represent X=1, $N_{ID}^{(1)}$ 42 to 83 may represent X=2, $N_{ID}^{(1)}$ 84 to 125 may represent X=3. Alternatively, $N_{ID}^{(1)}$ 0 to 41 may represents X=0, $N_{ID}^{(1)}$ 42 to 83 may represent X=1, $N_{ID}^{(1)}$ 84 to 125 may represent X=2, $N_{ID}^{(1)}$ 126 to 167 may represent X=3.

Mapping Alternative 0-2: $N_{ID}^{(2)}$ may be selected based on whether the source is D2DSSue_net (e.g. $N_{ID}^{(1)}$=0), D2DSSue_oon S=0 (e.g., $N_{ID}^{(2)}$=1), or D2DSSue_oon S=1 (e.g., $N_{ID}^{(2)}$=2) so that PD2DSS sequence indicates the source (e.g. eNB, UE1 or UE2). In other words, when hopping, the UE may select the same $N_{ID}^{(2)}$ as the one which is used in the received PD2DSS. $N_{ID}^{(1)}$ 0 to 41 may represent X=1, $N_{ID}^{(1)}$ 42 to 83 may represent X=2, $N_{ID}^{(1)}$ 84 to 125 may represent X=3. Alternatively, $N_{ID}^{(1)}$ 0 to 41 may represent X=0, $N_{ID}^{(1)}$ 42 to 83 may represent X=1, $N_{ID}^{(1)}$ 84 to 125 may represent X=2, $N_{ID}^{(1)}$ 126 to 167 may represent X=3.

Mapping Alternative 1: The combinations of PSS sequences and SSS sequences are used to represent different D2DSS sequence groups (which means when two different D2DSS sequence groups select the same LTE downlink PSS sequence, they select different SSS sequences). The ZC sequences with LTE downlink PSS sequence root indices (u=25, 29 and 34) may represent current stratum level only, the maximum allowed stratum level is assumed to be 3.

Applying Mapping Alternative 1 to D2DSS sequence group definition Alternative A: Both D2DSSue_oon_hop3_1 and D2DSSue_oon_hop3_0 use the same LTE downlink PSS sequence (one of the three ZC sequences from u=25, 29 and 34)), which represents current stratum level=3. Both D2DSSue_oon_hop_1 and D2DSSue_net use the same LTE downlink PSS sequence (one of the remaining two ZC sequences from u=25, 29 and 34), which represents current stratum level=2. D2DSSue_oon_hop1_1 uses the remaining one LTE downlink PSS sequence from u=25, 29 and 34, which represents current stratum level=1. In another example embodiment and mode the D2DSS sequences in D2DSSue_net and D2DSSue_oon may consist of PD2DSS and SD2DSS, e.g., PD2DSS1 indicates eNB source, PD2DSS2 indicates UE source, SD2DSS1 indicates 1 hop, then D2DSS1 consisting of PD2DSS1 and SD2DSS1 is in D2DSSue_net, while D2DSS2 consisting PD2DSS2 and SD2DSS1 is in D2DSSue_oon, so D2DSS1 and D2DSS2 are from different sets but have the same SD2DSS.

Applying Mapping Alternative 1 to D2DSS sequence group definition Alternative A': Both D2DSSue_oon_hop3_1 and D2DSSue_oon_hop3_0 use the same LTE downlink PSS sequence (one of the three ZC sequences from u=25, 29 and 34)), which represents current stratum level=3. Both D2DSSue_oon_hop_1 and D2DSSue_oon_hop2_0 use one LTE downlink PSS sequence from one of the remaining sequences with u=25, 29 and 34, which represents current stratum level=2. Both D2DSSue_oon_hop1_1 and D2DSSue_net use the remaining one LTE downlink PSS sequence from u=25, 29 and 34, which represents current stratum level=1.

Applying Mapping Alternative 1 to D2DSS sequence group definition Alternative B: Both D2DSSue_net_hop3 and D2DSSue_oon_hop3 use the same LTE downlink PSS sequence (one of the three ZC sequences from u=25, 29 and 34)), which represents current stratum level=3. Both D2DSSue_net_hop2 and D2DSSue_oon_hop2 use the same LTE downlink PSS sequence (one of the remaining two ZC sequences from u=25, 29 and 34), which represents current stratum level=2. D2DSSue_oon_hop1 uses the remaining one LTE downlink PSS sequence from u=25, 29 and 34), which represents current stratum level=1.

Applying Mapping Alternative 1 to D2DSS sequence group definition Alternative B': Both D2DSSue_net_hop3 and D2DSSue_oon_hop3 use the same LTE downlink PSS sequence (one of the three ZC sequences from u=25, 29 and 34)), which represents current stratum level=3. Both D2DSSue_net_hop2 and D2DSSue_oon_hop2 use the same LTE downlink PSS sequence (one of the remaining two ZC sequences from u=25, 29 and 34), which represents current stratum level=2. Both D2DSSue_net_hop1 and D2DSSue_oon_hop1 use the remaining one LTE downlink PSS sequence from u=25, 29 and 34), which represents current stratum level=1.

For Mapping Alternative 1, the synchronization source information can be carried by SD2DSS, or the sequence spacing in time domain, or even PD2DSCH.

Mapping Alternative 1.1: One SSS sequence out of 168*3=504 SSS sequences is selected by SD2DSS and specified to represent eNB synchronization source. The remaining 503 SD2DSS sequences represent UE synchronization source IDs.

Mapping Alternative 1.2: The spacing in time domain between PD2DSS and SD2DSS, or spacing in time domain between different PD2DSS if repeating PD2DSS sequence is allowed, or spacing in time domain between different SD2DSS if repeating SD2DSS sequence is allowed, is used to distinguish eNodeB synchronization source and UE synchronization sources. For example, if PD2DSS and SD2DSS are in consecutive time positions, it represents the synchronization source is eNodeB; if there is fixed number of spacing, e.g., 2 symbols, between them, it represents the synchronization source is UE.

Mapping Alternative 1.3: PD2DSCH information bit(s) are used to represent the device-to-device synchronization source information. This alternative may be applied on top of the above-described alternatives.

In Mapping Alternative 1, if more than 3 hops are allowed and 3 LTE downlink PSS sequence root indices are not enough to represent all stratum levels, ZC sequences with other sequence root indices may be used. Correspondingly, more D2DSS groups are defined. They may follow the same method mapping to ZC sequences and M-sequences.

Mapping Alternative 2.0: As discussed in Mapping Alternative 1, if there are totally 5 or 6 types of D2DSS information that need to be carried, they can be mapped to ZC sequences with 4 to 6 different sequence root indices u=25, 29 and 34 plus 1 to 2 extra indices) directly. In this case, the D2DSS is not needed to include SD2DSS for carrying such information.

As discussed herein, the number of PD2DSS sequences/symbols in a sub-frame depends on the D2D synchronization periodicity and chip or symbol level detection method. In one Alternative (Alternative a), one PD2DSS symbol is allowed in a sub-frame (e.g., for scenarios with detection search window similar to LTE PSS signal). In another Alternative (Alternative b), two or more PD2DSS symbols are allowed in a sub-frame (e.g., for scenarios with detection search window much larger than LTE legacy one). In this Alternative b case, all PD2DSS symbols use the same root indices.

In each synchronization period, the resource allocation method for PD2DSS with different stratum level and same synchronization source may be Time Division Multiplexing (TDM)

In each frame, the PD2DSS may be in any known fixed symbol position for frame timing obtaining.

FIG. 5 depicts one example of how to map D2D signals on the LTE frame with TDM resource allocation. The example of FIG. 5 is for a general case: FDD mode, maximum 3 hops allowed, 40 ms period, and 1 PD2DSS symbol in a sub-frame. In each frame within each synchronization period, one particular D2DSS is mapped and placed in some position. FIG. 5 provides some alternative examples for the mapping relationship.

In general, solutions described herein try to reuse LTE legacy synchronization design as much as possible so as to minimize specification work and implementation complexity, but carrying enough D2D information for D2DSS selection. On the other hand, one difference between LTE legacy synchronization design and the D2D synchronization design is energy consumption issue, as legacy LTE synchronization signal comes from eNodeB, while D2DSS normally comes from UE. This problem may be solved by multiple D2DSS TDM resource allocation and synchronization period control.

Another aspect of synchronization, and the technology disclosed herein, concerns when a wireless terminal (e.g., UE) becomes a synchronization source once it is out of network. Although it may be well known (see RAN1 Reflector L1 D2D parameters) if the maximum received D2D power (or some norm thereof) falls below a threshold, this in itself is not sufficient to keep the synchronization source capability of the UE from "thrashing" back and forth in time. Rather, it is necessary to build some hysteresis into the system. Two alternative ways of achieving this are shown by FIG. 12A and FIG. 12B. FIG. 12A show shows the use of two thresholds. The threshold Thresh_synch_low is based on the prior art. The new threshold Thresh_synch_high must be exceeded by the maximum received D2DSS power before the UE relinquishes its role as a synchronization source. In other words, if the maximum received D2DSS power is below the new threshold Thresh_synch_high, the UE keeps its role as the synchronization source. Alternatively, FIG. 12B shows a time domain approach wherein at least $T_{Thresh\_exceeded}$ seconds must pass once the maximum received D2DSS power exceeds a threshold before the UE relinquishes its role as synchronization source. The values Thresh_synch_low, Thresh_synch_high, and $T_{Thresh\_exceeded}$ may be signaled by Radio Resource Control (RRC) messages.

The "timing information" expressed by the D2DSS encompasses the aspect that, when the wireless terminal receives signals, the wireless terminal knows where is the beginning of the frame, the beginning of a sub-frame, etc. For example, using the timing information enables the wireless terminal to know, e.g., PD2DSS is located in the first symbol of each frame, then when a PD2DSS is detected (when the wireless terminal uses a proper PD2DSS sequence to detect and matches the received PD2DSS sequence, there will be an energy peak indicating the signal is detected) during synchronization, the wireless terminal knows the location of the starting symbol of a frame.

It was mentioned above that certain units and functionalities of the wireless terminal may be implemented by electronic circuitry 50. FIG. 11 shows an example of such electronic circuitry 50 as comprising one or more processors 90, program instruction memory 92; other memory 94 (e.g., RAM, cache, etc.); input/output interfaces 96; peripheral interfaces 98; support circuits 99; and busses 100 for communication between the aforementioned units.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

Thus, as explained herein, the D2DSS should carry by itself at least the information of synchronization source and current stratum level so as to make itself distinguishable, no matter whether there is PD2DSCH supplying information or not. Being different from PD2DSCH (which can carry information bits at the cost of higher complexity channel forward error correction coding and modulation), the D2D synchronization signal itself has limited capability to carry information.

In the frequency domain, it has been made as 3GPP working assumption that D2DSS (PD2DSS and SD2DSS) are transmitted in the central six Resource Blocks (RBs) enabling the frequency mapping of the synchronization signals to be invariant with respect to the system bandwidth.

As described herein, there are several methods which can be adopted by D2DSS to carry information: (1) PD2DSS from different ZC root sequence indices; (2) SD2DSS from different cyclic shift indices and ZC root sequence indices; (3) predefined fixed sequence positions (time domain); (4) predefined fixed sequence gap/distance (time domain) between sequences (between two PD2DSS sequences, or between two SD2DSS sequences, or between PD2DSS and SD2DSS sequences).

In the design of D2D synchronization signal, flexibility is provided to select one or combinations of above methods to carry necessary D2DSS information. However, considering the typical range of D2DSS information (2 synchronization source types (eNodeB and UE) and maximum 3 hops), some method with particular synchronization signal structure may be used, so as to reuse the legacy LTE synchronization signal design as much as possible and minimize specification and implementation work.

Same as legacy LTE PSS, the PD2DSS may be constructed from a frequency-domain Zadoff-Chu (ZC) sequence of length 63, with the middle element punctured to avoid transmitting on the d.c. (direct current) subcarrier. The set of ZC root sequence indices used in legacy LTE are u=25, 29 and 34 and selected for their good periodic autocorrelation and cross-correlation properties, which are enough to carry either information of synchronization source type or current stratum level. To make the best use of the existing PSS, the three legacy PSS sequences may be used to represent 1, 2 and 3 hops respectively. Meanwhile, same as legacy LTE SSS, the SD2DSS comes from maximum length sequence (M-sequence) based on a 5-bit shift register. Each SD2DSS sequence is constructed by interleaving, in the frequency domain, two length 25−1=31 M-sequence. These two sequences are two different cyclic shifts of a single length-31 M-sequence. The cyclic shift indices of the M-sequence are derived from a function of the physical-layer cell identities (PCI) group. In legacy LTE, there are 168 different SSS sequences associated with each of the three legacy PSS, which are good candidates to carry large information.

Similar to Physical Cell Identity (PCID) in cellular communication, a PSSID (Physical Synchronization Source IDentity) may be used for randomizing signals and interference, e.g., scrambling. In addition, it can be used to provide synchronization source information for D2DSS selection. The existing legacy SSS sequences are enough to be used for encoding the PSSID. According the evaluations in R1-135316, Multi-hop D2D synchronization performance [incorporated herein by reference in its entirety], it is observed that the maximum number of synchronization sources a D2D UE is able to find is around 135 for 3-hop and 60 for 4-hop.

D2D wireless terminals need to monitor a set of synchronization signals. This can be achieved by TDM between D2DSS associated to different hop counts and different synchronization source types for better spectrum efficiency. There is an agreement in previous 3GPP meetings that single frequency network (SFN) transmission is allowed for D2DSS, which means if the transmissions from different synchronization sources are strictly synchronized, the receiver UE will see a combined synchronization signal as if it is transmitted from just one synchronization source. In D2D communications, during each SS hopping, because of frequency mismatched in the transmitter and the receiver local oscillator, there is potential synchronization frequency offset existing which may cause timing inaccuracy. Therefore, the D2DSS with timing derived from the same synchronization source and with the same stratum level may occupy the same position in time domain with the same sequence for SFN transmission.

Furthermore, the periodicity of D2DSS may be related to idle UEs power consumption and implementation complexity. It has been made as working assumption that D2DSS period is not smaller than 40 ms, while the legacy LTE synchronization signal is transmitted twice per radio frame (5 ms periodicity). Since the legacy LTE adopts chip level hypothesis search for synchronization sequence, if the synchronization period is too long, e.g., 1 second, with relatively small number of TDM sequences occupying time domain positions, as mentioned in R1-133598, Techniques for Synchronization [incorporated herein by reference in its entirety], the receiver complexity becomes unacceptable, hence repeating PD2DSS in consecutive time domain positions results in a symbol level search for less complexity. On the contrary, if the sequence search window (between two consecutive PD2DSS) is close to the one of legacy LTE synchronization signals, reusing legacy LTE chip based receiver structure is more efficient with less implementation complexity issue. In such a case, multiple PD2DSS synchronization sequences (repeated sequences or TDM multi-user sequences) in each period are transmitted to accumulate correlation values from the matched filter to improve synchronization signal detection performance.

By way of recap, current 3GPP agreements define two sets of D2DSS (D2DSSue_net and D2DSSue_oon), which are used to distinguish in-coverage and out-of-coverage synchronization sources. However, current 3GPP agreements do not actually define what is a synchronization source. As explained herein, there may be four types of synchronization source definitions.

Based on the D2DSS sets defined herein, the technology disclosed herein further defines D2DSS subsets based on, e.g., synchronization source and hopping number. If both PD2DSS and SD2DSS are included in D2DSS, each individual D2DSS sequence actually means a combination of PD2DSS and SD2DSS. Therefore two D2DSS sequence belonging to two different subsets may have the same PD2DSS or SD2DSS, but may not have totally the same PD2DSS and SD2DSS.

If a sync source adopts definition (1) or (2), there are only 5 to 6 types D2DSS existing, so that either Alternative 1.2, Alternative 1.3 or Alternative 2 may be used. If the sync source definition adopts definition (1), hundreds of synchronization source IDs may exist, in which case Alternative 0 and Alternative 0 1.1 may be used (and in which case a relationship is set up between defined D2DSS belonging to each D2DSS subsets and the existing legacy LTE PSS/SSS sequences).

In Alternative 1.1, the first thing is to map the legacy LTE PSS sequences to the PD2DSS sequences of each D2DSS group, indicating the stratum level of D2DSS in that group; then 168*3=504 legacy LTE SSS sequences are mapped to the SD2DSS sequences of each D2DSS group, indicating the synchronization source via different ID. How to map SD2DSS is flexible.

In alternative 0, depending on X and S, the Mapping method is explicitly specified, but stratum level is no longer be represented by PD2DSS ZC sequences. For example, in alternative 0-2, D2DSSue_oon S=0_X=1, where X is hopping number, consists of PD2DSS (uses PSS with ZC u=29) and SD2DSS (uses SSS with $N_{ID}^{(2)}=1$ and $N_{ID}^{(1)}$ from 0 to 41); as comparison, D2DSSue_oon S=0_X=2 consists of PD2DSS (uses PSS with ZC u=29) and SD2DSS (uses SSS with $N_{ID}^{(2)}=1$ and $N_{ID}^{(1)}$ from 42 to 83). Therefore, stratum level actually is distinguished from SD2DSS, instead of PD2DSS in alternative 1.1

Simply speaking, the fundamental purpose of synchronization is the wireless terminals can have a correctly common timing to communicate with each other. As described herein, the synchronization signals of the technology disclosed herein themselves may carry other information. A receiver, such as D2DSS detector 42 of a wireless terminal 26, periodically checks a search window looking for synchronization signals (sequences). An example of such a search window may be as illustrated in FIG. 5. For example, during one window (in one 40 ms sync period), the UE may detect one 1-hop, one 2-hop and one 3-hop D2DSS and their corresponding synchronization sources (the UE can know these because they do not occupy the same time position (TDM). In addition, the detection is in physical layer, which in some ways is like a matched filter. The UE uses different ZC sequences to detect ZC sequences. Because of good autocorrelation and crosscorrelation properties, when the UE detects a high energy peak with some particular ZC sequence with particular root index, the UE knows what information is carried in this sequence. Then the UE compares the measured synchronization signal strength, the stratum level and the synchronization source and decides which D2DSS it will use. There are several alternative selection methods. For example, if the UE should follow the rule that it should always synchronize to eNB timing, then no matter what the current stratum level is (within maximum allowed one), it will select the D2DSS with eNB timing as its timing. Then, according to this D2DSS, for example, it is in UE's memory that PD2DSS is always in the second symbol of the third subframe of a frame, the UE can derive the boundary of the frame, then the UE can communicate with the sender.

Figure 13A:
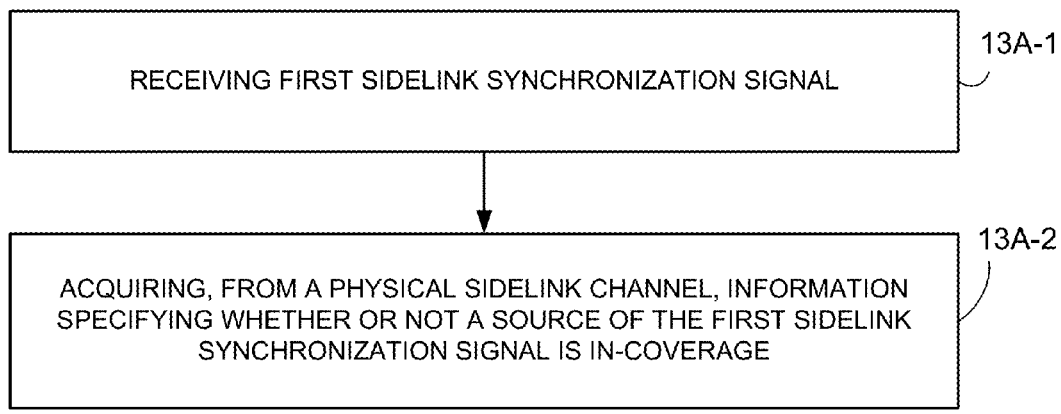
FIG. 13A and FIG. 13B are flowcharts showing basic, representative acts of steps comprising methods of operating a wireless terminal.

From the foregoing it is understood that the technology disclosed herein encompasses a method in a wireless terminal as shown by the representative, basic acts or steps of FIG. 13A. Act 13A-1 comprises the wireless terminal receiving a first sidelink synchronization signal (also known herein as a first D2D synchronization signal). Act 13A-2 comprises the wireless terminal obtaining from a physical sidelink channel, information specifying whether or not a source of the first sidelink synchronization signal is in-coverage. As explained previously, the first sidelink synchronization signal is generated by using at least a first identity.

Figure 13B:
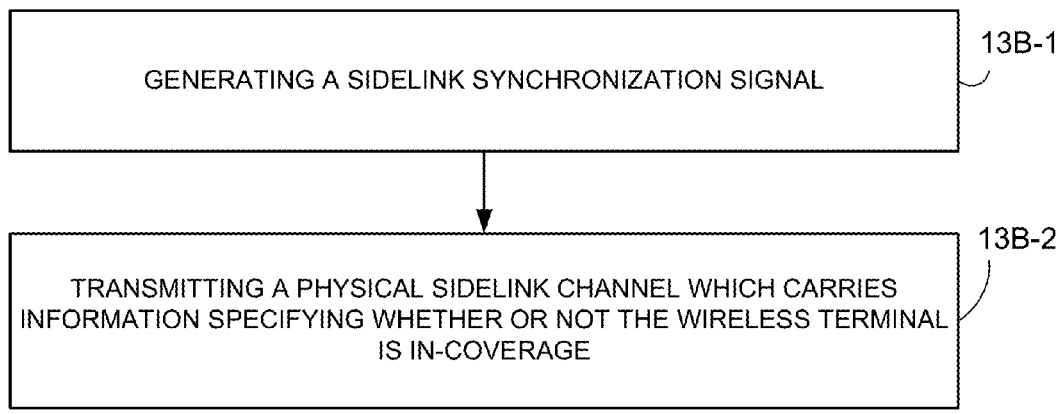

From the foregoing it is also understood that the technology disclosed herein encompasses a method in a wireless terminal as shown by the representative, basic acts or steps of FIG. 13B. Act 13B-1 comprises the wireless terminal generating a sidelink synchronization signal (also known herein as a D2D synchronization signal). Act 13B-2 comprises the wireless terminal transmitting a physical sidelink channel which carries information specifying whether or not the wireless terminal (UE) is in-coverage. Again, the sidelink synchronization signal is generated by using at least a first identity.

Some the terminology employed for concepts as described herein has been updated or changed in more recent industry documentation, such as the 3GPP Technical Standards, for example. As mentioned above, "device-to-device (D2D)" is now also called "sidelink direct". Some other terminology has also changed, a partial listing appearing in Table 3 below.

TABLE 3

Terminology

| Previous Terminology | New Terminology |
| --- | --- |
| Schedule assignment (SA) | PSCCH Physical Sidelink Control Channel |
| PD2DSCH (Phys. D2D Synch. Channel) | PSBCH (Phys. Sidelink Broadcast Channel) |
| D2DSS (D2D synchronization signals) | SLSS (Sidelink Synchronization Signals) |
| D2D Communications or Data Channel | PSSCH (Physical Sidelink Shared Channel) |
| D2D Discovery Channel | Physical Sidelink Discovery Channel (PSDCH) |

The technology disclosed herein provides numerous benefits. For example, the technology disclosed herein proposes that synchronization source information and current stratum level information be carried in D2DSS. The technology disclosed herein defines new types of sequence groups which can be used by D2DSS, so as to include synchronization source information and current stratum level information in the definition of groups. The technology disclosed herein maps the new sequence groups to the existing LTE sequences to obtain D2DSS. According to embodiments of the technology disclosed herein, D2DSS with different stratum level are TDMed in each D2D synchronization period for better spectrum efficiency.

Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as, for example, solid-state memory, magnetic disk, optical disk, etc containing an appropriate set of computer instructions that may be executed by a processor to carry out the techniques described herein.

The term "electrical signal" is used herein to encompass any signal that transfers information from one position or region to another in an electrical, electronic, electromagnetic, optical, or magnetic form. Electrical signals may be conducted from one position or region to another by electrical, optical, or magnetic conductors including via waveguides, but the broad scope of electrical signals also includes light and other electromagnetic forms of signals (e.g., infrared, radio, etc.) and other signals transferred through non-conductive regions due to electrical, electronic, electromagnetic, or magnetic effects, e.g., wirelessly. In general, the broad category of electrical signals includes both analog and digital signals and both wired and wireless mediums. An analog electrical signal includes information in the form of a continuously variable physical quantity, such as voltage; a digital electrical signal, in contrast, includes information in the form of discrete values of a physical characteristic, which could also be, for example, voltage.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Circuitry can be described structurally based on its configured operation or other characteristics. For example, circuitry that is configured to perform control operations is sometimes referred to herein as control circuitry and circuitry that is configured to perform processing operations is sometimes referred to herein as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A user equipment (UE) comprising:
a receiver configured to detect a first sidelink synchronization signal; and
a controller configured to acquire, from the physical sidelink channel, information specifying whether or not a source of the first sidelink synchronization signal is in-coverage; wherein
the first sidelink synchronization signal is generated by using at least a first identity.

2. The user equipment (UE) of claim 1, wherein
the first sidelink synchronization signal is generated by further using a second identity,
a range of the first identity is [0, 1], and
a range of the second identity is [0-167].

3. The user equipment (UE) of claim 2, wherein
a value "0" of the first identity corresponds to in-coverage and
a value "1" of the first identity corresponds to out-of-coverage.

4. The user equipment (UE) of claim 1, wherein
a root index of a sequence for the first sidelink synchronization signal is determined by using at least the first identity.

5. The user equipment (UE) of claim 1, further comprising:
a generator configured to generate a second sidelink synchronization signal; and
a transmitter configured to transmit the physical sidelink channel which carries information specifying whether or not the UE is in coverage; wherein
the second sidelink synchronization signal is generated by using at least the first identity.

6. A user equipment (UE) comprising:
a controller configured to generate a sidelink synchronization signal; and
a transmitter configured to transmit the physical sidelink channel which carries information specifying whether or not the UE is in coverage; wherein
the sidelink synchronization signal is generated by using at least a first identity.

7. The user equipment (UE) of claim 6, wherein
the sidelink synchronization signal is generated by further using a second identity,
a range of the first identity is [0, 1], and
a range of the second identity is [0-167].

8. The user equipment (UE) of claim 7, wherein
a value "0" of the first identity corresponds to in-coverage, and
a value "1" of the first identity corresponds to out-of-coverage.

9. The user equipment (UE) of claim 6, wherein a root index of a sequence for the sidelink synchronization signal is determined by using at least the first identity.

10. A method in a user equipment (UE), the method comprising:
receiving a first sidelink synchronization signal; and
acquiring, from a physical sidelink channel, information specifying whether or not a source of the first sidelink synchronization signal is in-coverage; wherein the first sidelink synchronization signal is generated by using at least a first identity.

11. The method of claim 10, the method further comprising:
generating a second sidelink synchronization; and
transmitting the physical sidelink channel which carries information specifying whether or not the UE is in coverage; wherein
the second sidelink synchronization signal is generated by using at least the first identity.

12. A method in a user equipment (UE), the method comprising:
generating a sidelink synchronization signal; and
transmitting a physical sidelink channel which carries information specifying whether or not the UE is in coverage; wherein
the sidelink synchronization signal is generated by using at least a first identity.

* * * * *